US009311755B2

(12) United States Patent
Duplessis et al.

(10) Patent No.: US 9,311,755 B2
(45) Date of Patent: Apr. 12, 2016

(54) SELF-DISCLOSING CONTROL POINTS

(71) Applicant: Microsoft Corporation, Redmond, WA (US)

(72) Inventors: Jean Pierre Duplessis, Kirkland, WA (US); Monty Hammontree, Duvall, WA (US); Xiaoji Chen, Seattle, WA (US); Emmanuel Athans, Seattle, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 305 days.

(21) Appl. No.: 13/689,738

(22) Filed: Nov. 29, 2012

(65) Prior Publication Data

US 2014/0146039 A1 May 29, 2014

(51) Int. Cl.
*G06T 15/00* (2011.01)
*G06T 13/00* (2011.01)
*G06T 19/20* (2011.01)
*G06F 3/0484* (2013.01)
*G06F 3/0488* (2013.01)

(52) U.S. Cl.
CPC ............ *G06T 19/20* (2013.01); *G06F 3/04845* (2013.01); *G06F 3/04883* (2013.01); *G06F 3/04886* (2013.01); *G06T 2200/24* (2013.01); *G06T 2219/2021* (2013.01)

(58) Field of Classification Search
CPC ............ G06F 3/04845; G06F 3/04883; G06F 3/04886; G06T 19/20; G06T 2200/24; G06T 2219/2021
See application file for complete search history.

(56) References Cited

U.S. PATENT DOCUMENTS

| 4,158,481 | A | * | 6/1979 | Hoyer ........................... 359/478 |
| 4,791,581 | A | | 12/1988 | Ohba |
| 6,629,065 | B1 | | 9/2003 | Gadh et al. |
| 7,557,736 | B1 | * | 7/2009 | Daily et al. ................ 340/995.1 |
| 7,609,262 | B2 | * | 10/2009 | Olhofer et al. ................ 345/420 |
| 2004/0095352 | A1 | * | 5/2004 | Huang .......................... 345/473 |
| 2010/0105443 | A1 | | 4/2010 | Vaisanen |
| 2010/0138759 | A1 | * | 6/2010 | Roy .............................. 715/764 |
| 2010/0315424 | A1 | * | 12/2010 | Cai ............................... 345/427 |
| 2011/0164029 | A1 | | 7/2011 | King et al. |
| 2014/0304272 | A1 | | 10/2014 | Park et al. |

OTHER PUBLICATIONS

Dana H. Ballard and Christopher M. Brown, "Computer Vision", Prentice-Hall, Inc., 1982, Appendix A1.7.*
Autodesk, "AutoCAD 2012 User's Guide", Autodesk, Inc., 2011, p. 642-650.*

(Continued)

*Primary Examiner* — Sing-Wai Wu
(74) *Attorney, Agent, or Firm* — Kevin Sullivan; Kate Drakos; Micky Minhas

(57) ABSTRACT

A smart object represents a 3D graphics object whose control points are disclosed to a user. The control points are displayed for a user to use in performing simple and complex transformations on the 3D graphics object. The control points are positioned in areas where transformations are more likely to be made by a user. A transformation may be an action along one or more axes of the object, such as, rotation, scaling, and translation. The user may utilize the control points to perform a series of transformations that create a particular 3D graphics object without requiring expertise in the 3D graphics modeling application.

20 Claims, 24 Drawing Sheets

(56) References Cited

OTHER PUBLICATIONS

Yu, et al., "FI3D: Direct-Touch Interaction for the Exploration of 3D Scientific Visualization Spaces", Retrieved at <<http://hal.inria.fr/docs/00/58/73/77/PDF/Yu_2010_FDT.pdf>>, In Proceedings of IEEE Trans. Vis. Comput. Graph., Nov. 2010, vol. 16, pp. 1613-1622.

Sharma, et al., "MozArt: A Multimodal Interface for Conceptual 3D Modeling", Retrieved at <<http://www.hpl.hp.com/india/documents/papers/icmi4111d-sharma-madhvanath.pdf>>, ICMI '11 Proceedings of the 13th International Conference on Multimodal Interfaces, Nov. 18, 2011, pp. 307-310.

Billinghurst, et al., "3D Palette: A Virtual Reality Content Creation Tool", Retrieved at <<http://www.hitl.washington.edu/publications/r-97-23/>>, Proceedings of the ACM Symposium on Virtual Reality Software and Technology, Aug. 1997, pp. 155-156.

"Surface Editing", Retrieved at <<http://wiki.blender.org/index.php/Doc:2.4/Manual/Modeling/Surfaces/Editing>>, Retrieved Date: Jun. 26, 2012, pp. 12.

Au, et al., "Multitouch Gestures for Constrained Transformation of 3D Objects", Retrieved at <<http://visgraph.cse.ust.hk/projects/multitouch/EG12-manipulation.pdf>>, Computer Graphics Forum, vol. 31, May 2012, pp. 651-660.

"Maya-Finishing the Head from Tutorial 4", Published on Dec. 19, 2011, Available at: https://web.archive.org/web/20111219005823/http://www.ideepix.nl/ARIL/3D/maya/?show=14, pp. 2.

"GP2 3D Object Editing from Beginners", Published on Aug. 9, 2011, Available at: https://web.archive.org/web/20110809055140/http://grandprix2.de/Anleitung/ tutus/3D_Object_editing/3d_object_editing.htm, pp. 14.

Blevins, Neil, "Modeling Using the 3DSMax Modifier Stack", Published Mar. 3, 2011, Available at: http://en.render.ru/books/show_book.php?book_id=1014, pp. 10.

"Non-Final Office Action Issued in U.S Appl. No. 13/689,739", Mailed Date: Feb. 11, 2015, 22 pages.

"Final Office Action Issued in U.S Appl. No. 13/689,739", Mailed Date: Jul. 30, 2015, 24 pages.

* cited by examiner

SELF-DISCLOSING CONTROL POINTS

CROSS-REFERENCE TO RELATED APPLICATION

This application is related in subject matter to co-pending U.S. application Ser. No. 13/689,739, entitled "DIRECT MANIPULATION USER INTERFACE FOR SMART OBJECTS", filed on Nov. 29, 2012.

BACKGROUND

Computer graphics tools are often used to generate three-dimensional (3D) digital images. The computer graphics tools may include a user interface consisting of icons and menu options that enable a user to construct such images. However, a user may need to spend a considerable amount of time to learn the complexities of the computer graphics tool to generate an image. A user may have to learn which combination of menus, buttons, keystrokes, and/or mouse clicks are needed to generate the sequence of transformations that creates the image. The user may need to specify exact dimensions, tolerances, and positions in a specific manner. In some instances, this may require a user to understand the complexities of computer graphics modeling or to develop an expertise in the use of the computer graphics tool. For users not familiar with computer graphics modeling or the nuances of a computer graphics tool, a substantial effort may be involved.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A user interface for an application provides a user with smart objects. A smart object is a 3D graphics object that has control points embedded in areas of the object that are more likely to be used to perform a transformation on the object. The user may utilize the control points to perform a series of transformations in order to create a particular 3D graphics image without requiring expertise in the application's user interface. Through the use of a smart object, a user may perform simple and complex transformations to create or modify a 3D graphics image more easily.

Each control point may be associated with a behavior and a constraint. A behavior indicates a type of transformation that a control point may facilitate along an axis and a constraint indicates the maximum distance the transformation may be performed along an axis. A user moves a control point in a manner prescribed by its behavior and within the limits set by the constraint to apply a particular transformation to the object.

The user interface may contain a voice recognition module that is associated with a set of voice commands. The voice commands contain words used to perform a transformation. A control point may be referenced by a label that uniquely identifies it. A user may apply a transformation using the voice commands with reference to the labels associated with a control point.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments are directed to a technology for utilizing a smart object to create and/or modify a 3D graphics image. A smart object is a 3D graphics object that contains control points. The control points are positioned in areas where transformations are more likely to be made by a user. A user may manipulate a control point in an intended manner in order to apply a transformation on an object. A transformation may be an action along one or more axes, such as, rotation, scaling, and translation. The user may utilize the control points to perform a series of transformations on the smart object in order to create and/or modify a 2D or 3D graphics image.

Each control point may be associated with a behavior and a constraint. A behavior describes a transformation that may be applied by the user to the object at the control point. A constraint describes the limits to the transformation. A user may select a control point by interacting with the control point directly through a user input device or through voice commands. The user may then manipulate the control point to produce a transformation defined by the behavior subject to the limits imposed by the constraint. Upon validation of the user's action, the 3D graphics object is re-rendered accordingly.

In one or more embodiments, a label may be applied to each control point to uniquely identify a control point. The label may be used to initiate a transformation through voice-activated commands that reference the label associated with a control point.

Figure 1:
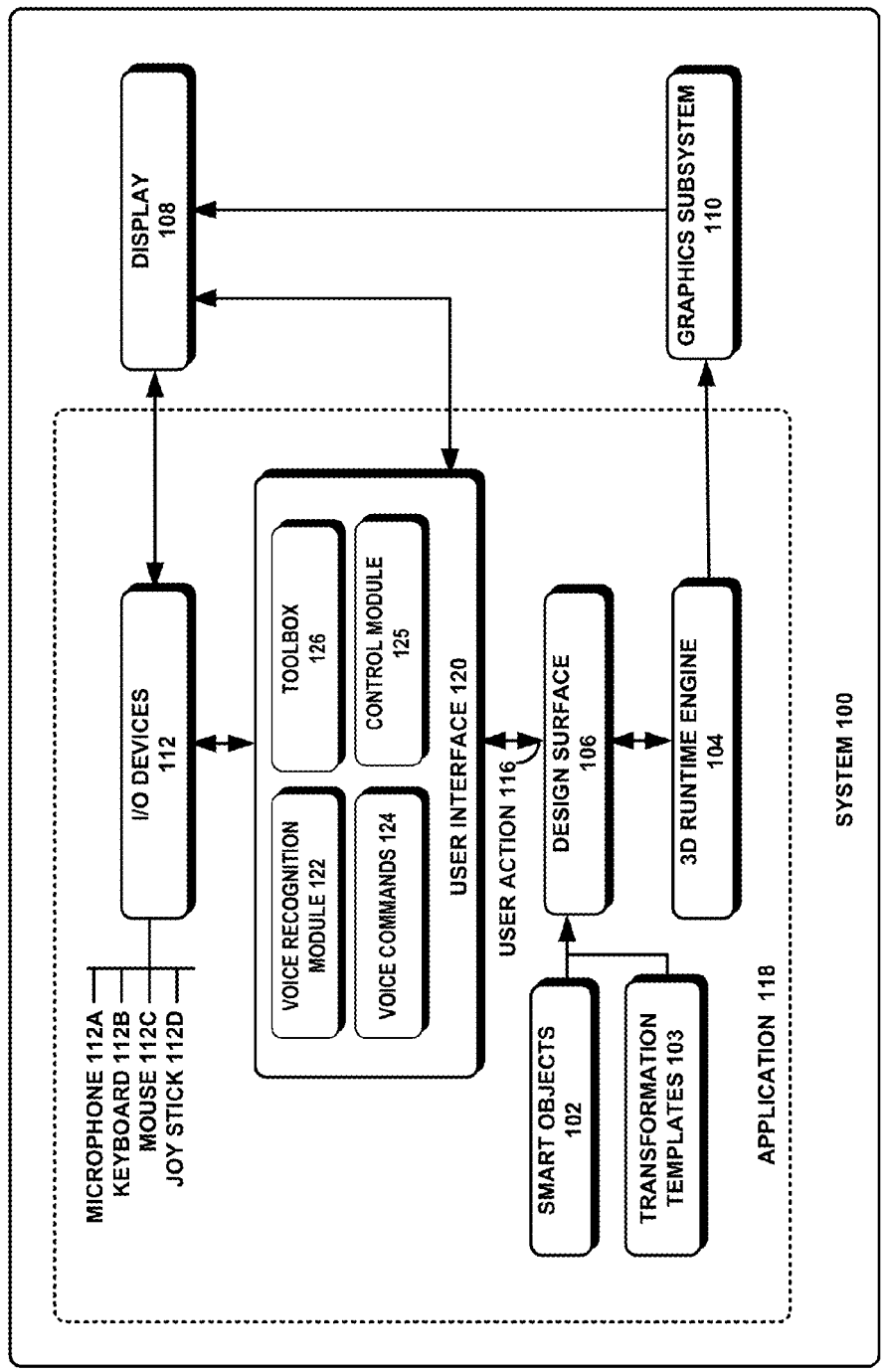
FIG. 1 is a block diagram illustrating an exemplary system utilizing self-disclosing control points.

Attention now turns to a discussion of a system that utilizes self-disclosing control points. Turning to FIG. 1, there is shown a system 100 having at least a smart object 102, transformation templates 103, a 3D runtime engine 104, a design surface 106, a display 108, a graphics subsystem 110, one or more input devices 112, and a user interface 120. Although the system 100 as shown in FIG. 1 has a limited number of elements in a certain topology, it may be appreciated that the system 100 may include more or less elements in alternate topologies as desired for a given implementation.

A smart object 102 describes a 3D graphics object having control points. A 3D graphics object may be composed of surfaces and lines that when rendered make the object appear real. Surfaces and lines are represented as complex mathematical expressions that are defined by a set of control points. A control point is defined within a coordinate system having an x, y, and z-axis where the axes correspond to width, height, and depth respectively. The location of a control point is defined by its x, y, and z coordinates. The control points are used to compute a polynomial that passes through the control points thereby forming a surface or line. A complex object may be subdivided into smaller parts where each part is represented by a polygon. Transformations on an object may be performed by moving one or more control points and then regenerating the set of polygons that are used to shape the surface or curve thereby producing a 3D graphics object reflecting the transformations.

A smart object 102 includes one or more control points where each control point may have a corresponding behavior and constraint. A control point represents a point on a surface or curve where a transformation may be applied to the entire object in the manner described by a behavior. A transformation may include scaling, rotation, or translation. Scaling resizes an object along any one or more axes. A rotation rotates an object along any one or more axes. A translation moves an object along any one or more axes. The behavior describes a particular transformation along one or more axes. A constraint is a limit imposed on a transformation. In some embodiments, the behavior may include executable code that may execute upon the user interacting with the control point in a prescribed manner.

A smart object 102 may be embodied in the form of a file stored in a memory, hard disk drive, and the like. The smart object file may be implemented in a programming language (e.g., C++, etc.), a markup language (e.g., XML, etc.), a scripting language (e.g., Jscript, VBScript, Perl, etc.), and the like. The behavior of the smart object 102 describes a transformation and it may be implemented as executable code, data, or combination thereof.

A transformation template 103 includes instructions on how to insert additional control points to a smart object in order to apply a specific transformation. A user may utilize a transformation template to add control points to an object in order to perform the associated transformation.

Figure 2:
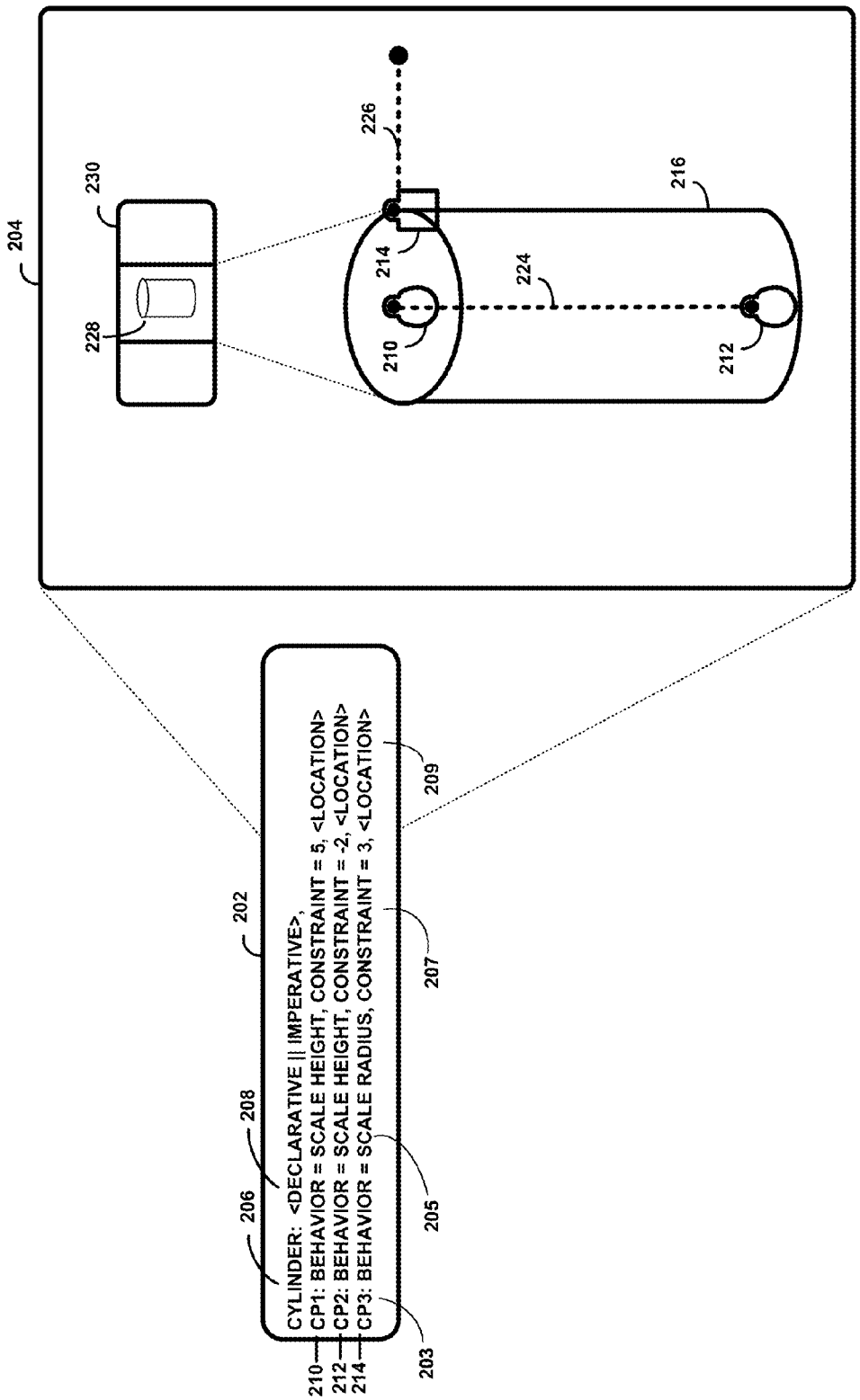
FIG. 2 illustrates an exemplary smart object file and a visual representation of a smart object.

FIG. 2 illustrates an exemplary smart object file 202 that describes the smart object 216 rendered on the display 204. The display 204 shows an icon 228 of the smart object displayed in a menu 230. When the user selects the icon 228, the smart object 216 appears on the display 204 with its control points, 210, 212, 214.

A control point may be represented by a particular shape or icon. As shown in FIG. 2, control points 210, 212 are 3D control points that are represented with a circular-shaped handle. A 3D control point is used to apply any transformation along one or more of the x, y, z axes. Control point 214 is a two dimensional control point that is represented with a square-shaped handle. A two dimensional control point performs a single transformation along a single axis.

The smart object file 202 may contain data indicating a name 206 identifying the smart object and an attribute 208 indicating whether the control points are declarative or imperative. A declarative control point declares the constraint of the transformation through a constraint value. An imperative control point contains programmable code that is invoked when the smart object is used. The programmable code controls the user's actions with regards to the control point including different actions that may occur when a user exceeds the bounds of a constraint.

Each control point may also be described using an identifier 203, a behavior 205, a constraint 207, and a location 209. An identifier 203 contains a name identifying the control point, the behavior 205 indicates a type of transformation, the constraint 207 indicates a limit on the transformation, and the location 209 provides a description of the placement of the control point on the graphic object. The location 209 may be a reference to a memory location or file including the data used to display the control point onto the graphics object.

As shown in FIG. 2, the smart object file 202 may include three control points: CP1, 210; CP2, 212; and CP3, 214. The description for control point CP1, 210, indicates that the control point controls height (i.e., behavior=scale height) and that the control point scales the height by a length of at most 5 units (i.e., constraint=5). The description for control point CP2, 212, indicates that the control point controls height (i.e., behavior=scale height) and that the control point shortens the height by at most a length of 2 units (i.e., constraint=−2). The description for control point CP3, 214, indicates that the control point controls the radius (i.e., behavior=scale radius) and that the control point scales the radius by a length of at most 3 units (i.e., constraint=3).

Display 204 shows a cylinder 216 having three control points that were described in the smart object file 202. The dotted lines 224, 226 may be displayed to show the direction along which a control point may be moved. For instance, dotted line 224 shows the vertical movement of control points 210, 212 and dotted line 226 shows the horizontal direction along which a user may move control point 214.

Turning back to FIG. 1, a user may interact with a smart object 102 through any one or more input/output (I/O) devices 112, such as a microphone 112A, keyboard 112B, mouse 112C, joy stick 112D, and so forth. A touch screen display 108 may be used that has the capability to recognize and process touches and gestures made to a touch screen embedded in the display 108. A user may interact with the touch screen display 108 through a pen, a pointing device, the user's finger, and so forth. Although, the embodiments are described with respect to a touch screen display, the embodiments are not limited in this manner. User input may be applied through other forms of input devices, such as a keyboard, joy stick, and so forth.

The user's input is captured by the user interface 120. The user interface 120 may include a voice recognition module 122, voice commands 124, a control module 125, and a toolbox 126. A user may also interact with the smart object through voice commands that are received through a microphone 112A and processed by a voice recognition module 122. The voice recognition module 122 may recognize a set of voice commands 124 that are tailored for 3D graphic transformations on the smart objects. The voice recognition module 112 converts the voice commands into executable instructions for use by the design surface 106 to apply the user-intended transformation.

The toolbox 126 may include tools, toolbars, menus, icons, and the like that a user may use to create and manipulate 3D graphic objects. Regardless of the manner in which the user's input is applied through the input devices, the user actions 116 are received by a control module 125 that processes them into executable instructions that are transmitted to the design surface 106.

The design surface 106 generates geometric models for the 3D graphic objects that are encompassed in a scene. The design surface 106 receives data describing a smart object from smart object file 102 and transformation templates 103. The design surface 106 uses this data to form 3D geometric models which the 3D runtime engine 104 converts into a digital image that is used by a graphics subsystem 110 to render onto the display 108.

The graphics subsystem 110 renders the digital images onto the display 108. The graphics subsystem 110 contains one or more graphics processing units (GPU) and a graphics memory dedicated to performing the rendering process.

In one or more embodiments, the application 118 may be a graphics software application, a 3D modeling application, a computer-aided design (CAD) tool, an integrated development environment (IDE) 118 (e.g., Visual Studio®, a 3D printing application, a graphics application controlling a printer, a computer video gaming application, or any combination thereof. In other embodiments, one or more components of application 118 may be embedded into other software applications, such as an operating system, web browser, and so forth.

In one or more embodiments, the 3D runtime engine 104, design surface 106, user interface 120, and application 118 may be a sequence of computer program instructions, that when executed by a processor, causes the processor to perform methods and/or operations in accordance with a prescribed task. The 3D runtime engine 104, design surface 106, user interface 120, and application 118 may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

In various embodiments, the system 100 described herein may comprise a computer-implemented system having multiple elements, programs, procedures, modules, such as without limitation, a mobile device, a personal digital assistant, a mobile computing device, a smart phone, a cellular telephone, a handheld computer, a server, a server array or server farm, a web server, a network server, an Internet server, tablet, a work station, a mini-computer, a mainframe computer, a supercomputer, a network appliance, a web appliance, a distributed computing system, multiprocessor systems, or combination thereof. The elements of the system may be implemented in hardware, a combination of hardware and software, or software. For example, an element may be implemented as a process running on a processor, a hard disk drive, multiple storage drives (of optical and/or magnetic storage medium), an object, an executable, a thread of execution, a program, and/or a computer. One or more elements may reside within a process and/or thread of execution, and an element may be localized on one computer and/or distributed between two or more computers as desired for a given implementation. The embodiments are not limited in this manner.

Attention now turns to exemplary illustrations showing the use of control points in performing various transformations.

Figure 3A:
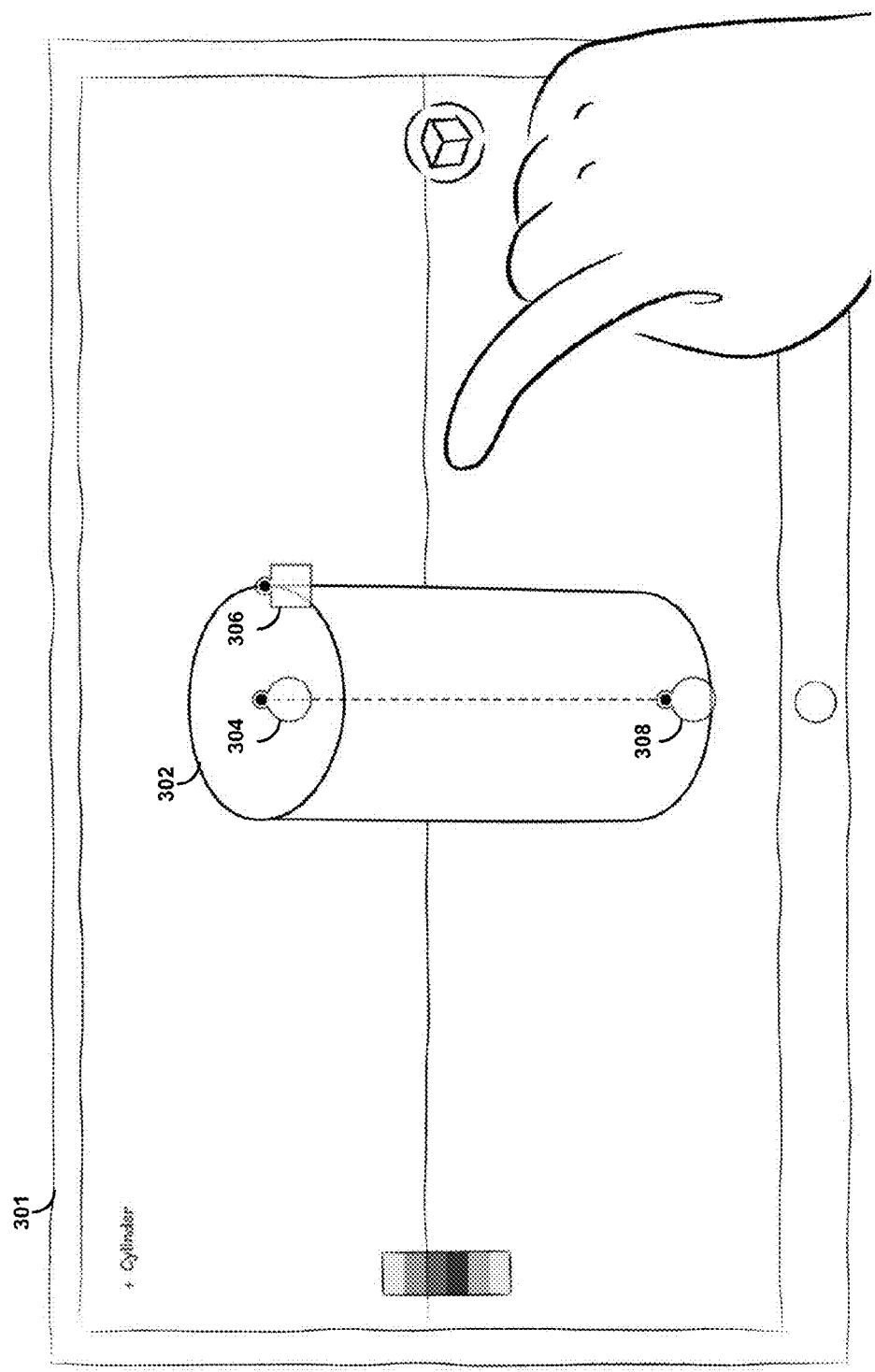
FIGS. 3A-3B are exemplary illustrations showing the use of a control point to scale the radius of a cylinder.
Figure 3B:
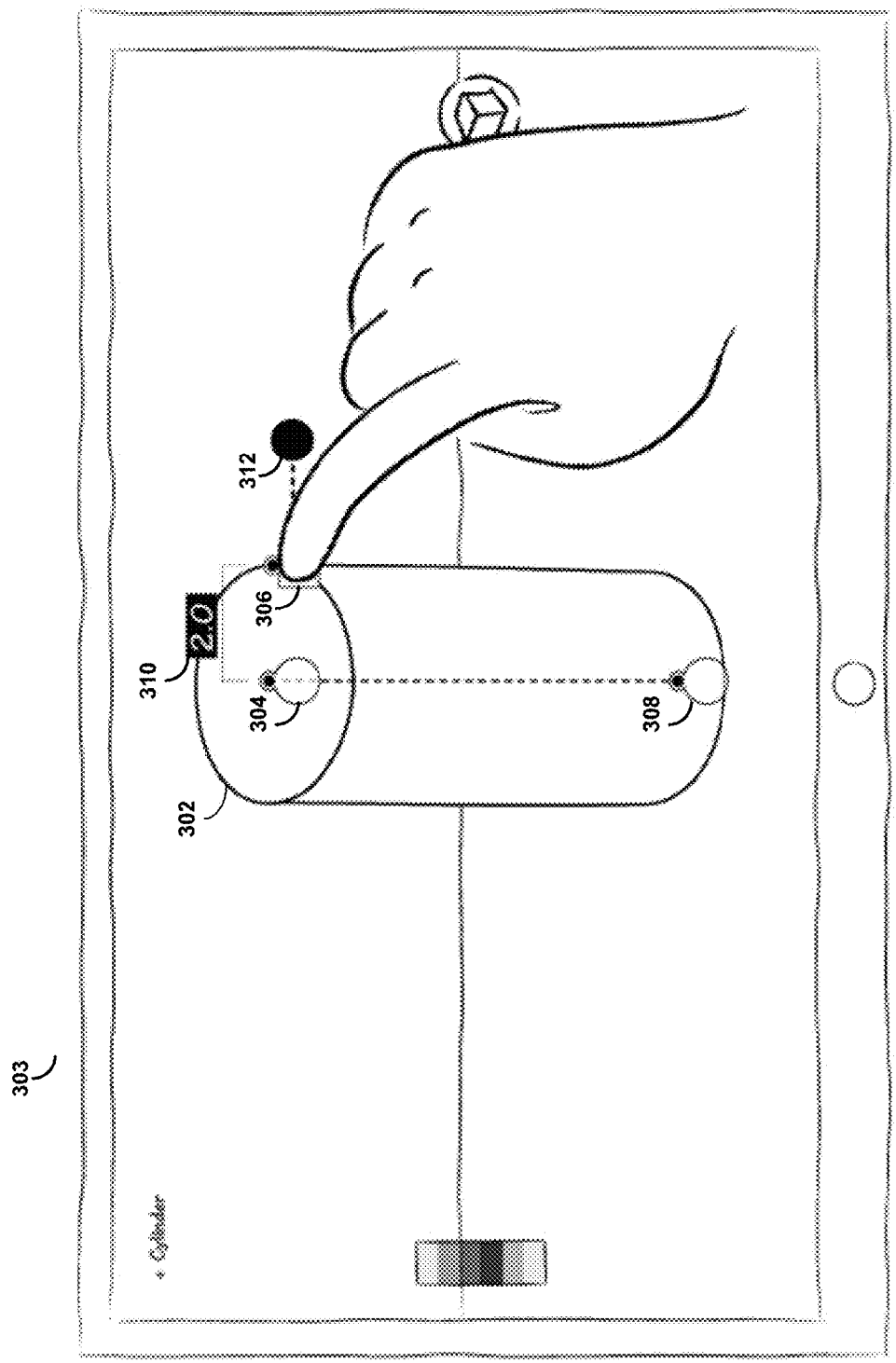

FIGS. 3A-3B are exemplary illustrations depicting a transformation applied to a smart object having a one-dimensional (1D) control point. Referring to FIG. 3A, there is shown a user interface 301 having a smart object 302 configured as a cylinder. The smart object 302 has two 3D control points 304, 308 and a 1D control point 306. As shown in the user interface 303 FIG. 3B, a user may touch the 1D control point 306 and a label 310 appears indicating the current measurement of the cylinder's radius which is 2.0 units. The user may drag the 1D control point 306 to position 312 thereby extending the radius of the cylinder along the x-axis. The 1D control point 306 may be configured to extend the radius to the value or amount specified by the control point's constraint. In the event, the user extends the radius beyond the control point's constraint value, the radius is extended to the limit specified by the control point's constraint value.

Although FIGS. 3A-3B show how a smart object is scaled, it should be noted that the same technique may be applied to other types of transformations and should not be construed to the exemplary illustrations shown in FIGS. 3A-3B.

Figure 4A:
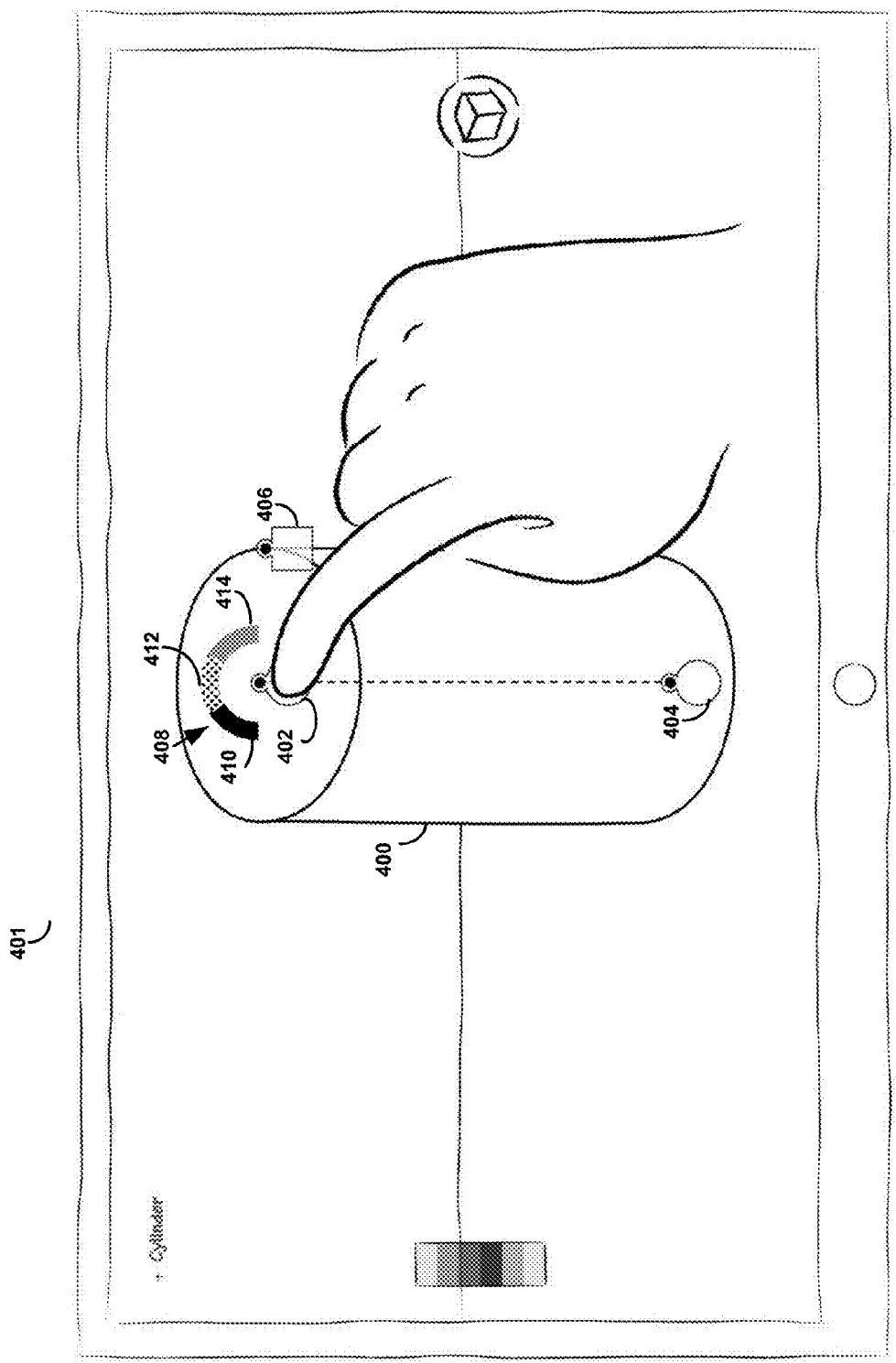
FIGS. 4A-4B are exemplary illustrations showing the use of axis locking.
Figure 4B:
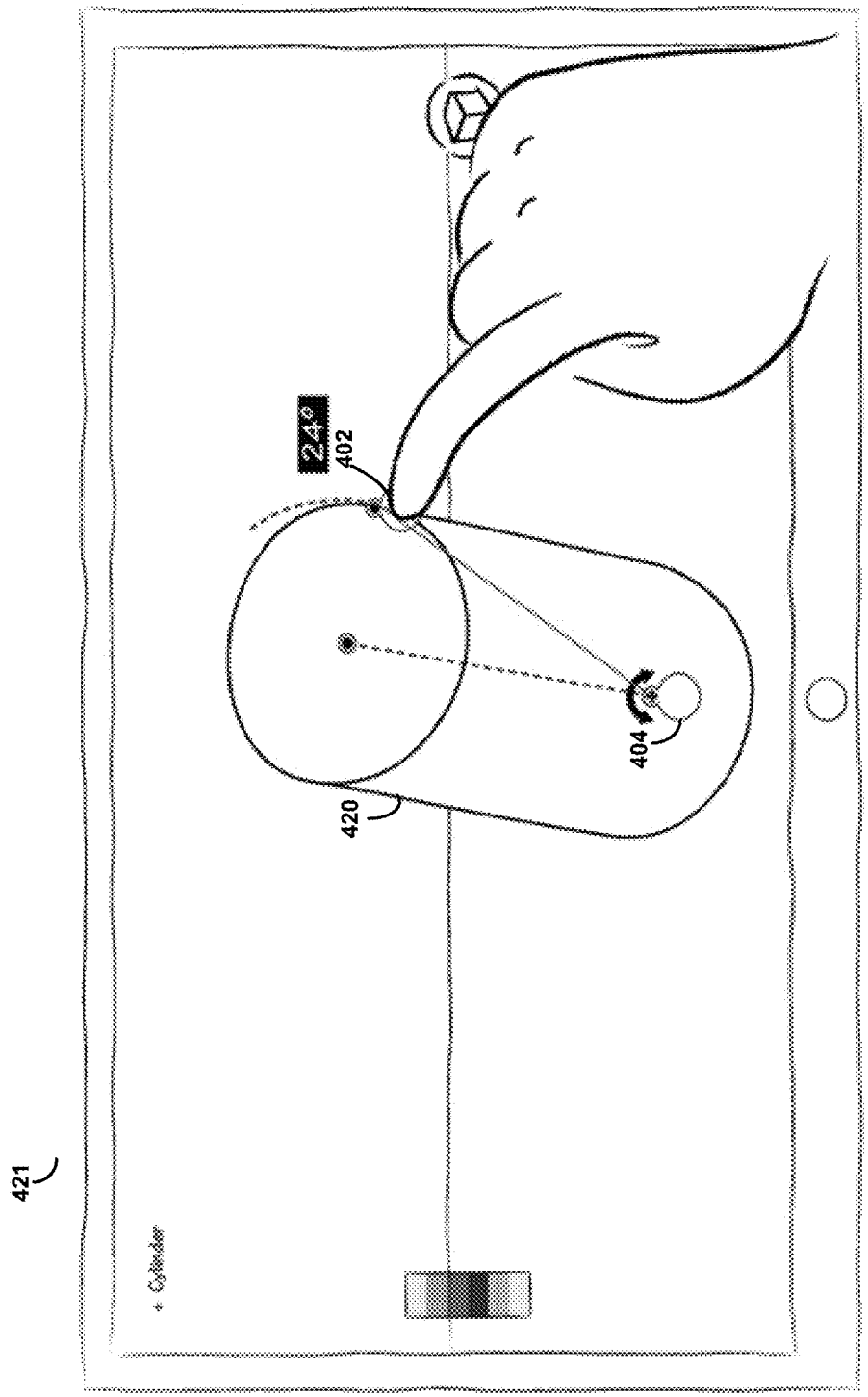

FIGS. 4A-4B are exemplary illustrations depicting another transformation. Referring to FIG. 4A, there is shown a user interface 401 depicting a smart object 400 configured as a cylinder. The smart object 400 has two 3D control points 402, 404 and a 1D control point 406. In order to rotate the smart object along the y-axis, the user touches control point 402 and an axis lock menu 408 appears. The axis lock menu 408 is composed of three segments where each segment represents a specific axis. Segment 410 represents the x-axis, segment 412 represents the y-axis, and segment 414 represents the z-axis. In order to make the transformation along the y-axis, the user touches segment 412 which locks the y-axis. Referring to FIG. 4B, as shown in user interface 421, the user drags control point 402 along the y-axis thereby rotating the cylinder by 24 degrees along the y-axis.

Figure 5A:
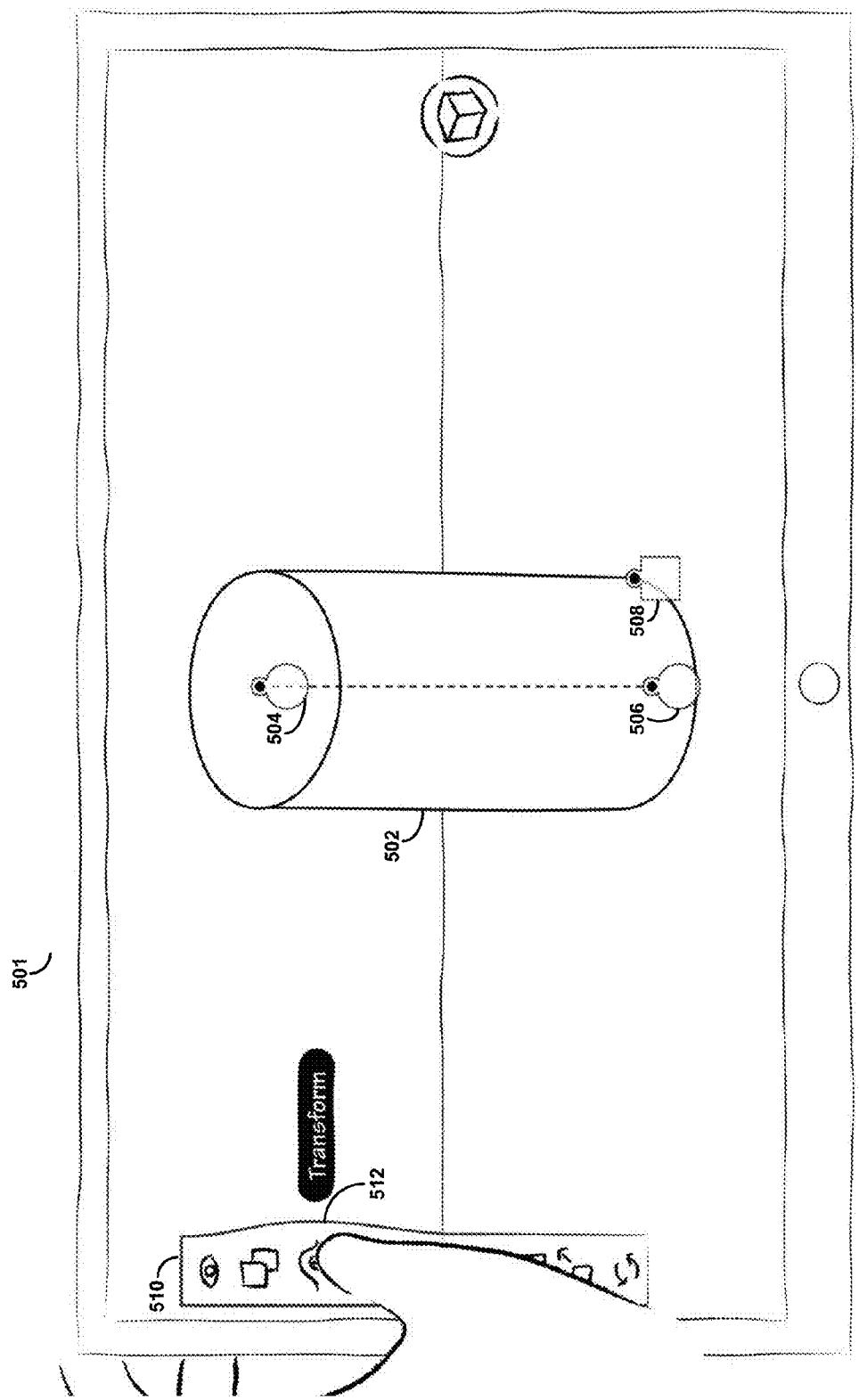
FIGS. 5A-5C are exemplary illustrations showing the use of a transformation template.
Figure 5B:
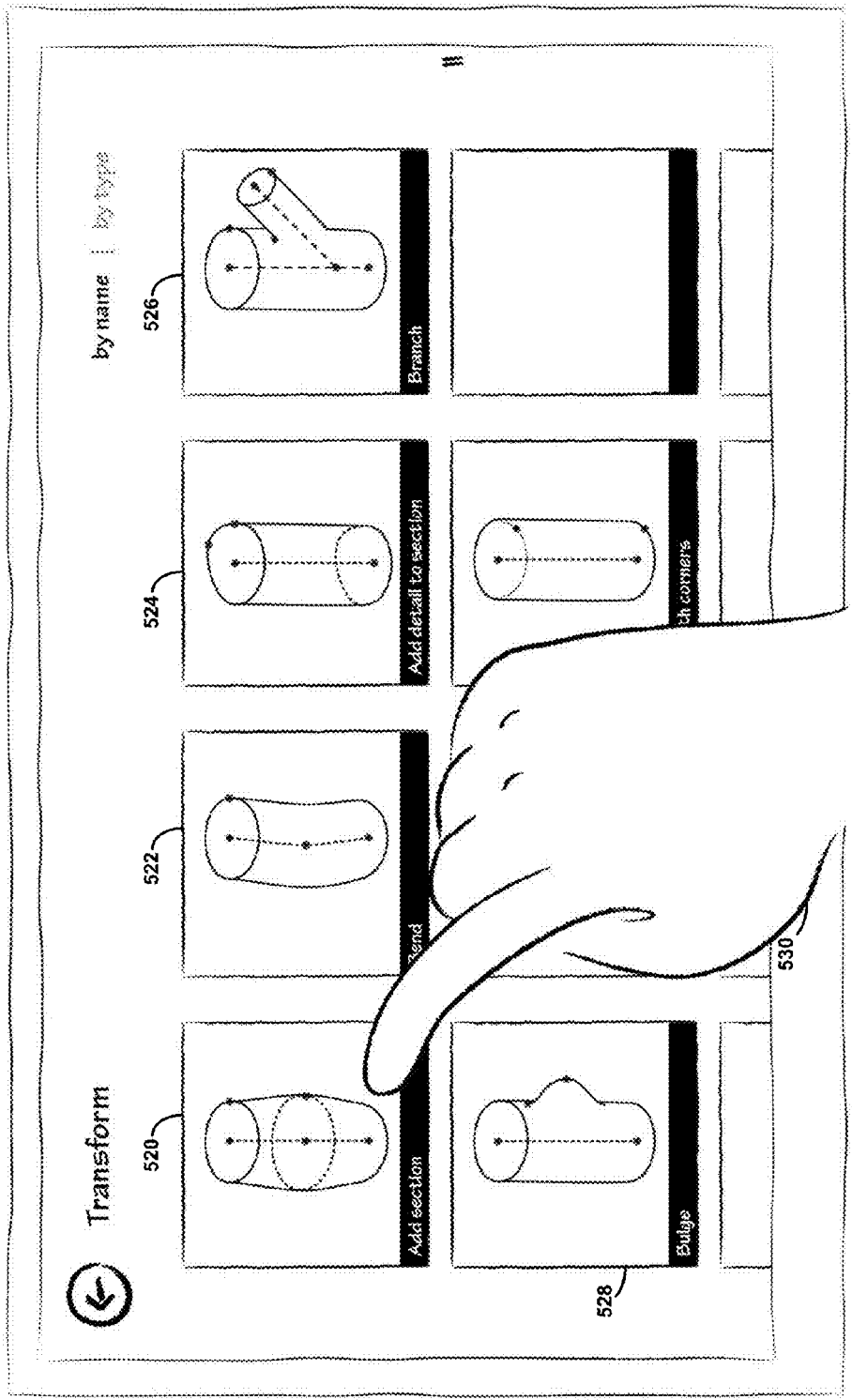
Figure 5C:
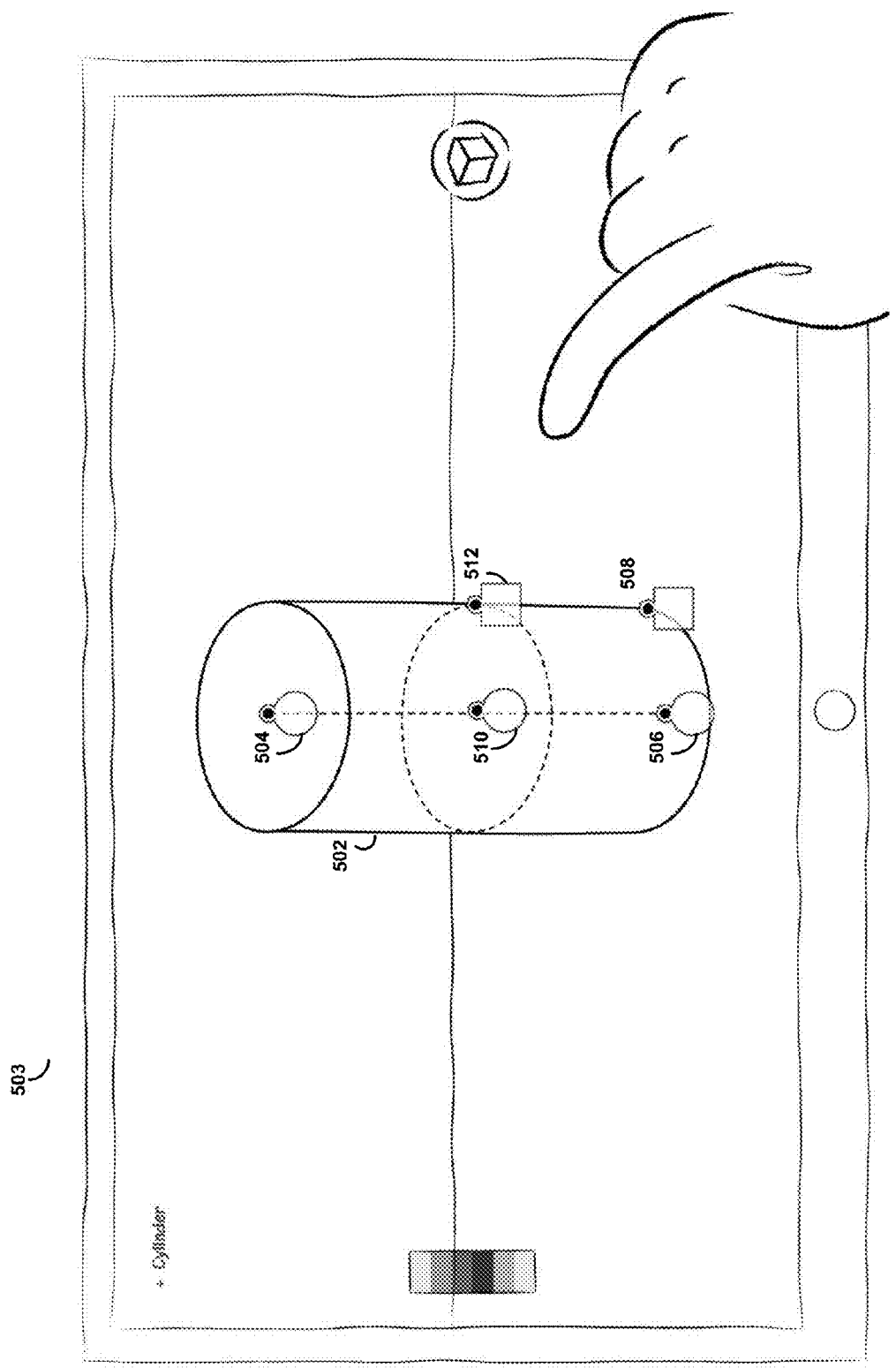

FIGS. 5A-5C are exemplary illustrations of transformation templates that insert additional control points onto an object. Referring to FIG. 5A, there is shown a smart object 502 configured as a cylinder. The cylinder has three control points, 504, 506, 508. The user may select from a menu bar 510 the transform option 512. By pressing the transform option 512, several templates may be displayed which are shown in FIG. 5B.

Referring to FIG. 5B, there are shown several exemplary transformation templates. Template 520 (i.e., add section template) inserts control points to a midsection of the cylinder. Template 522 (i.e., bend template) inserts control points to bend the cylinder to the left at a midpoint position. Template 524 (i.e., add detail to section template) inserts control points to add a segment or detail to a section of the cylinder. Template 526 (i.e., branch template) inserts control points to add a branch to the cylinder. Template 528 (i.e., bulge template) inserts control points to form a bulge to a portion of the cylinder.

As shown in FIG. 5B, the user 530 selects transformation template 520. FIG. 5C shows the result of applying transformation template 520 to cylinder 502. As shown in user interface 503 in FIG. 5C, the cylinder 502 has control points 510, 512 added to the midsection of cylinder 502. Cylinder 502 also has control points 504, 506, 508. The user may use the additional control points 510, 512 to apply a transformation to the midsection of the cylinder.

It should be noted that although FIG. 5B shows a few exemplary transformation templates, the embodiments are not constrained to those shown in FIG. 5B. Other types of templates are possible such as without limitation: add a point on a spline, curve or section; add a twist; round corners; mirror a section; duplicate a portion or the whole object; construct a symmetric image; add a bulge or pit; unite multiple objects; subtract an object from other object; or intersect one object with another object.

Figure 6A:
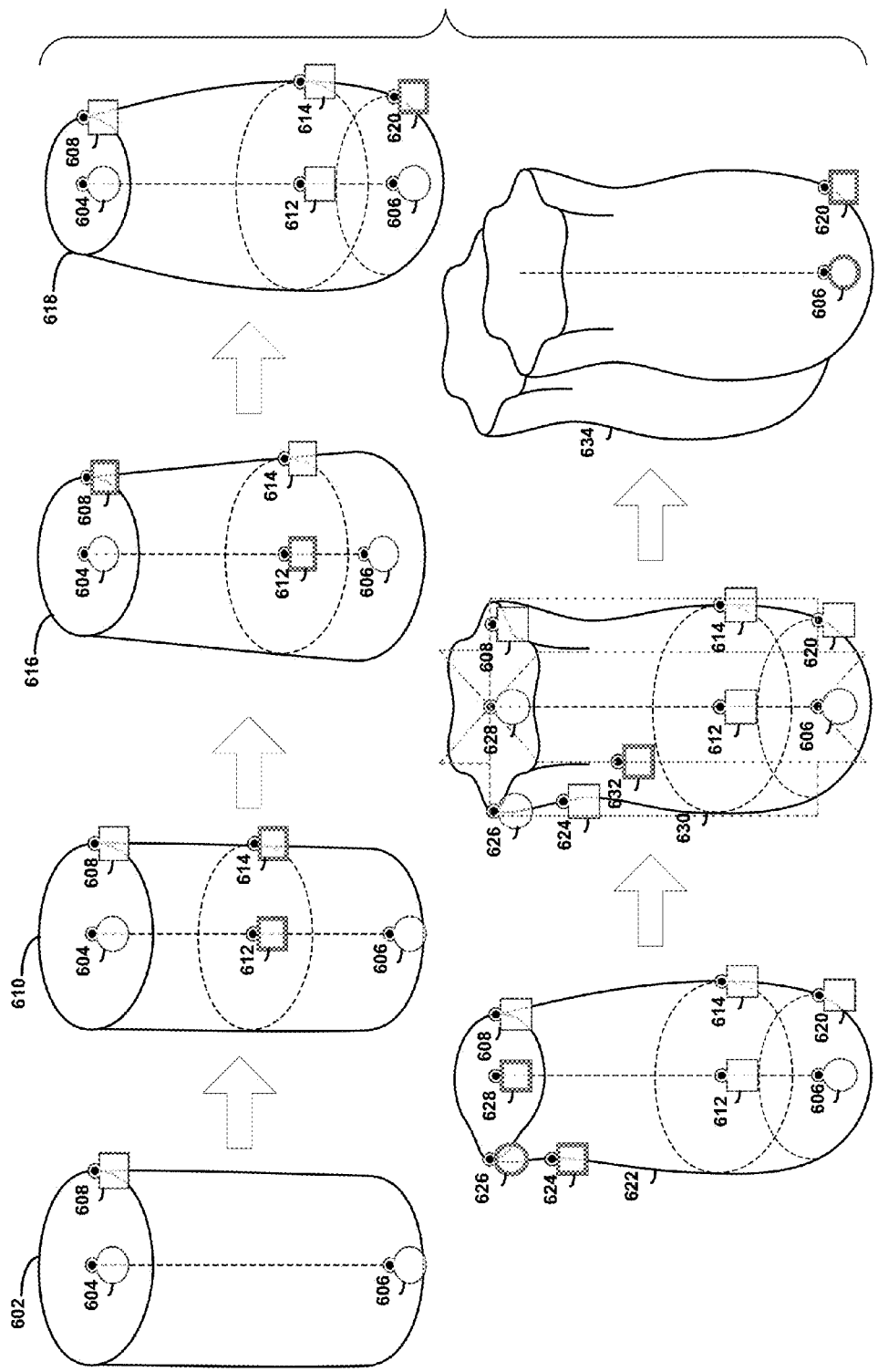
FIGS. 6A-6B are exemplary illustrations showing a series of transformations applied using control points that generate a complex 3D object.
Figure 6B:
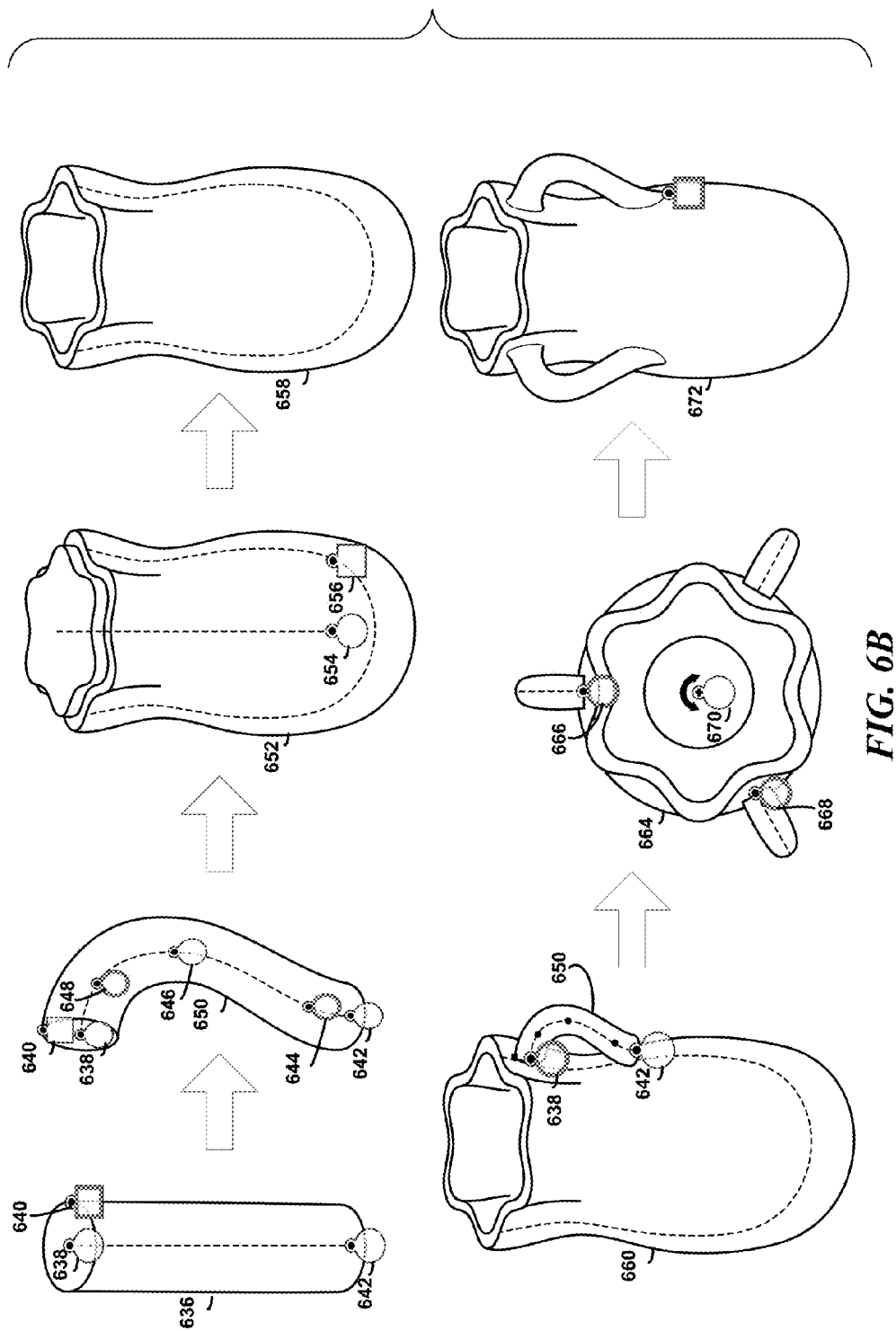

FIGS. 6A and 6B illustrate the use of self-disclosing control points to create a Grecian vase from a smart object. Turning to FIG. 6A, a user may import smart object 602 shaped as a cylinder and which has control points 604, 606, and 608. A middle section may be added to the cylinder using a transformation template which results in cylinder 610. The newly added middle section is controlled by control points 612, 614. Control points 612, 614 are 1D control points that may be used to scale the middle section of the cylinder along the x-axis thereby generating cylinder 616. A bottom section may be added to the cylinder through application of another transformation which adds 1D control point 620 to cylinder 618. Control point 620 may be used to control the newly added bottom section.

A bulge transform may be added to the top of cylinder 618 which is shown in object 622. The bulge is defined by control points 624, 626, 628. Next, a symmetry transform is applied to object 622 so that both sides of the object are identical which results in object 630. Control point 632 controls one dimension of the symmetry. A duplicate transform is applied to object 630 resulting in an identical object appended to object 630 which is shown as object 634.

FIG. 6B shows the continued application of additional transforms to the smart object created in FIG. 6A and in particular, creates and attaches three handles to the smart object. A smart object 636 configured as a cylinder is imported and has control points 638, 640, 642. A transformation template is used to add control points 644, 646, 648 to the spine of smart object 636 in order to shape the smart object 650 into a handle. The spine is configured into a handle by manipulating control points 644, 646, 648.

A move and scale transform is applied to smart object 634, shown in FIG. 6A, to move one of the duplicate objects resulting in smart object 652. One of the duplicate objects has control points 654, 656 which are used to apply a subtraction transform to eliminate duplicate segments resulting in smart object 658. A move and scale transform is applied to the handle 650 so that the handle is attached to smart object 658 using control points 638, 642 and the result is object 660. Smart object 660 is rotated using control point 670 and shown as object 664. A duplicate transformation is applied so that the additional handles are made and attached at control points 666, 668 resulting in the Grecian urn or smart object 672.

Figure 7A:
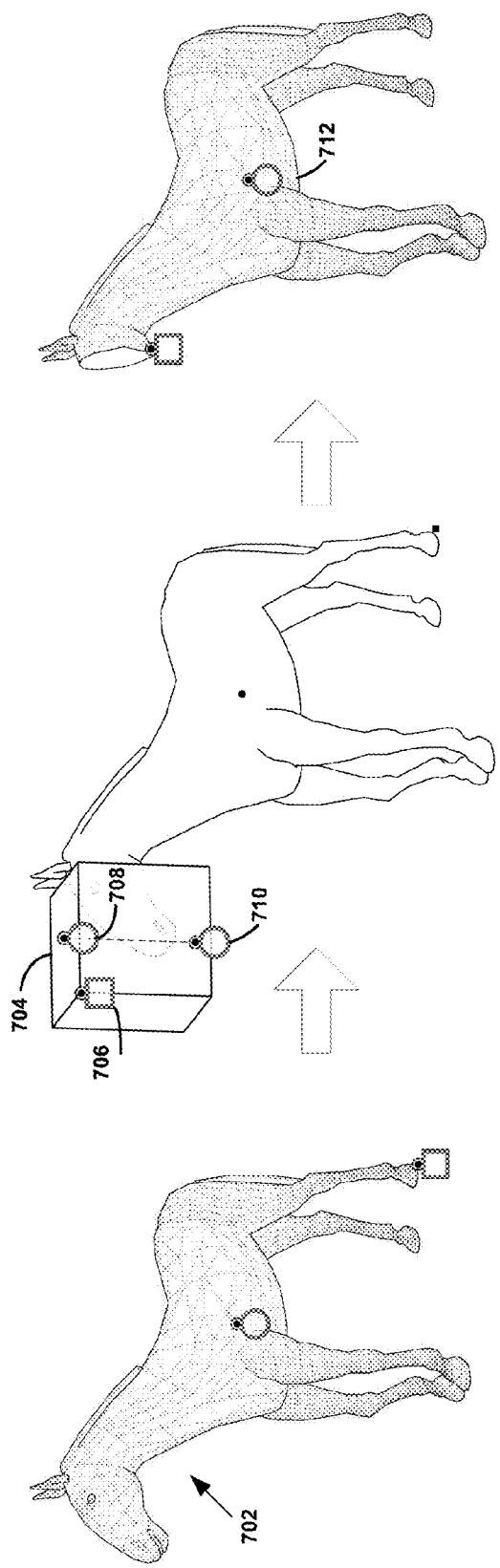
FIGS. 7A-7B are exemplary illustrations showing a series of transformations applied using control points to a mesh to modify a 3D object.
Figure 7B:
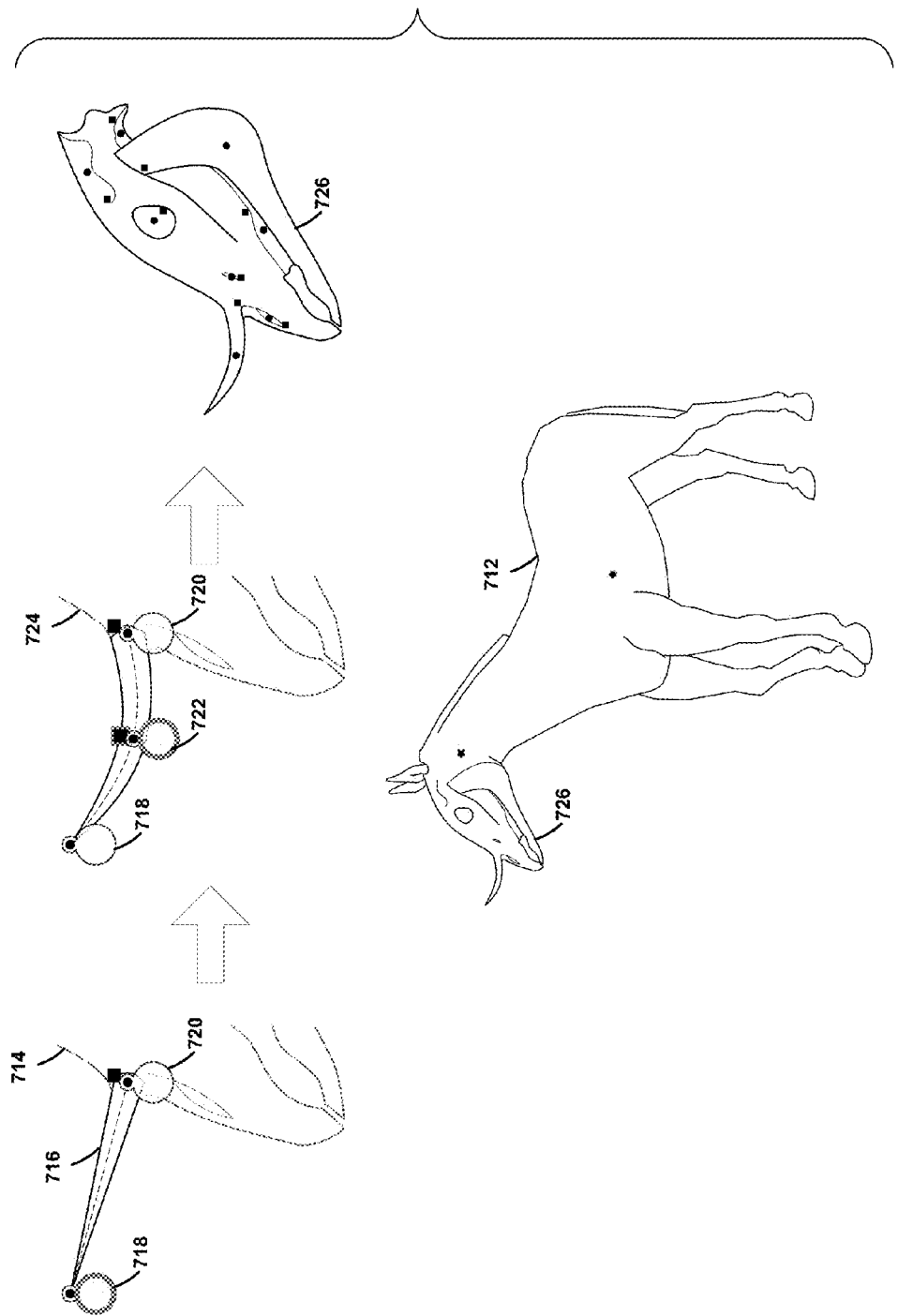

FIGS. 7A-7B shows how transformations may be made to a pre-existing mesh through the use of self-disclosing control points. It should be noted that although the illustrations are shown with respect to a particular image and transformation, the techniques are not limited in this manner.

A mesh is a set of vertices, edges, and polygons that represent a 3D object. The mesh may be imported into an application 118 from a preexisting file. As shown in FIG. 7A, a mesh of a horse 702 may be imported. A user may wish to transform the horse into a unicorn by adding a horn to the horse's head. A user may remove the horse's head through application of box transformation template 704. The box is placed over the horse's head and through manipulation of the box's control points 706, 708, 710, the head is removed which is shown as object 712.

Turning to FIG. 7B, a smart object 716 in the shape of a cone may be attached to the horse's head 714. The smart object 716 has control points 718, 720 which may be used to move and attach cone 716 to the horse's head 714. An additional control point 722 may be added to the cone 716 so that the shape of the cone is curved through manipulation of control point 722. The result of these transformations is shown in the new head object 726. The head 726 is then moved and attached to the horse's body 712.

FIGS. 8A-8E are exemplary illustrations showing the manner in which self-disclosing control points may be used to perform transformations through voice-activated commands. It should be noted that although the illustrations are shown with respect to a particular image and transformation, the techniques are not limited in this manner.

Figure 8A:
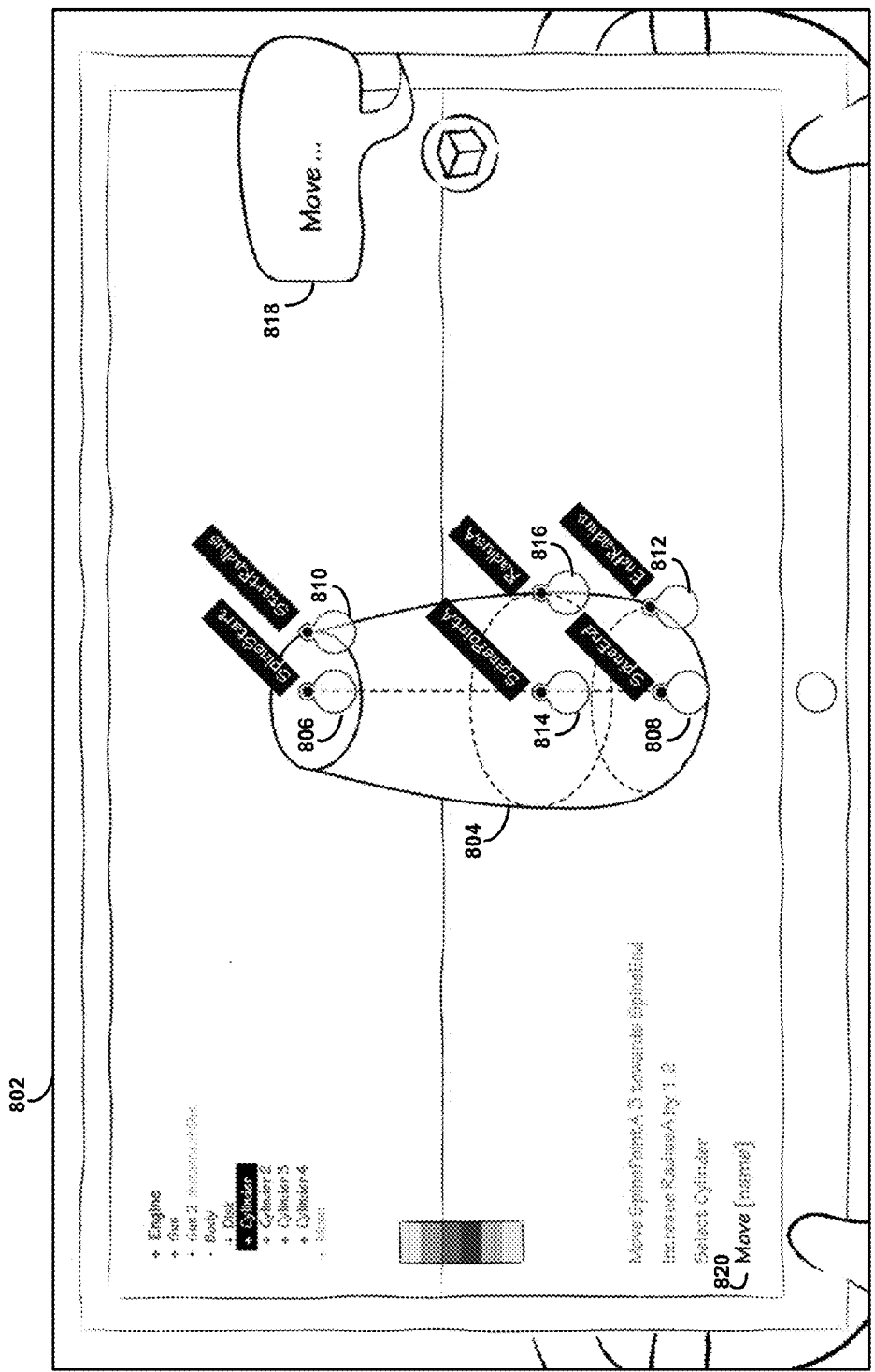
FIGS. 8A-8E are exemplary illustrations showing the use of voice input to facilitate transformation using control points.

Turning to FIG. 8A, there is shown a user interface 802 illustrating a smart object 804 having labels that uniquely identify each control point. Control points 806 and 808 control transformations about the center spine of smart object 804, control points 810, 812 controls transformations about the radius of the smart object 804 and control points 814, 816 control transformations along the midsection of the smart object 804. Control point 806 is associated with the SpineStart label, control point 808 is associated with the SpineEnd label, control point 810 is associated with the StartRadius label, control point 812 is associated with the EndRadius label, control point 814 is associated with the SpinePointA label and control point 816 is associated with the RadiusA label.

Figure 8B:
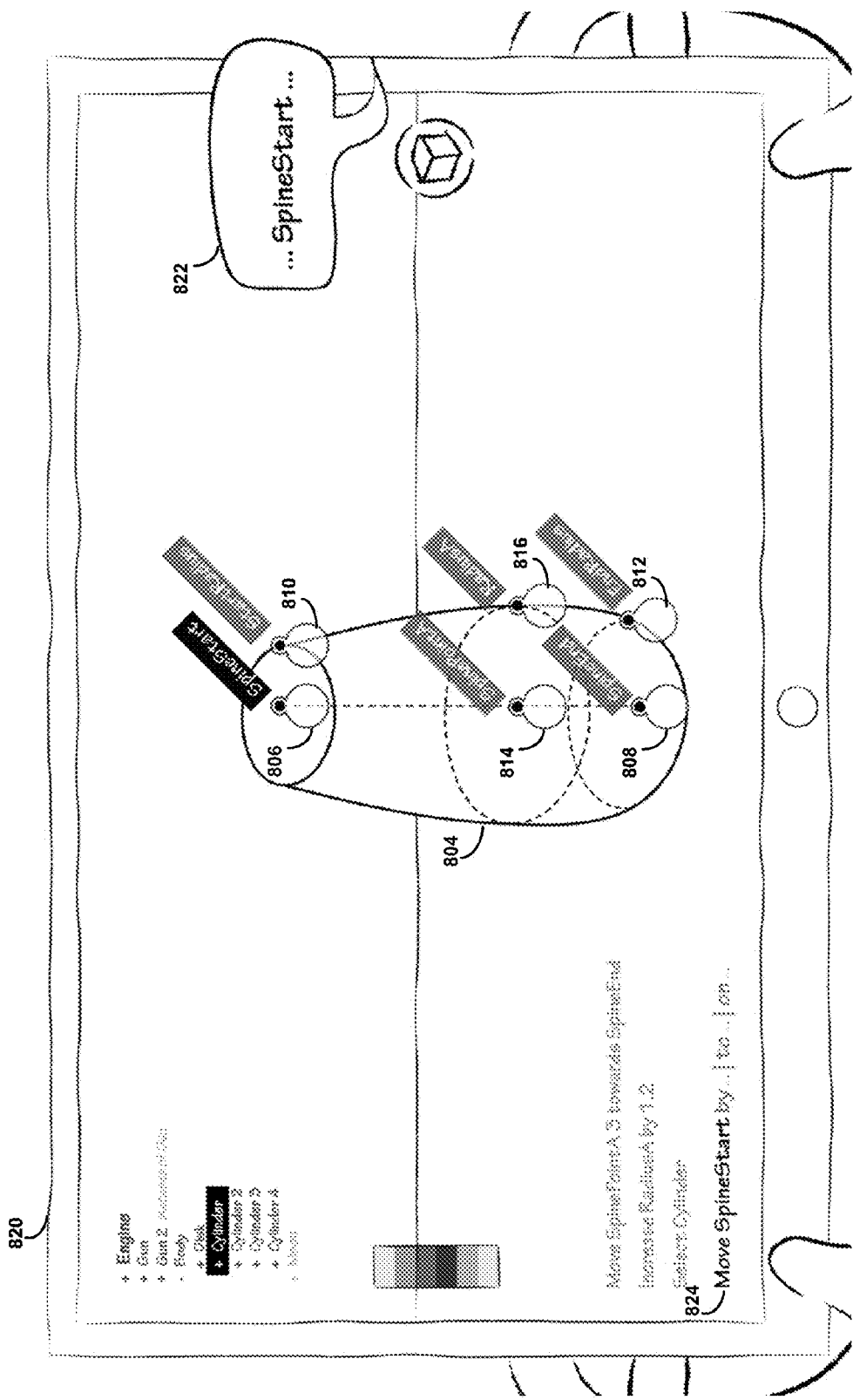

A user may initiate a transformation by speaking voice commands that reference the control points. As each word is spoken, the words may be displayed in the user interface. For example, as shown in FIG. 8A, as a user speaks the word "Move" 818, the word is captured on the display screen as shown in block 820. Turning to FIG. 8B, as the user speaks the word "SpineStart" after the word "Move", the "SpineStart" label is highlighted while the other labels are ghosted. The word "Move" is appended to the rest of the phrase in block 824.

Figure 8C:
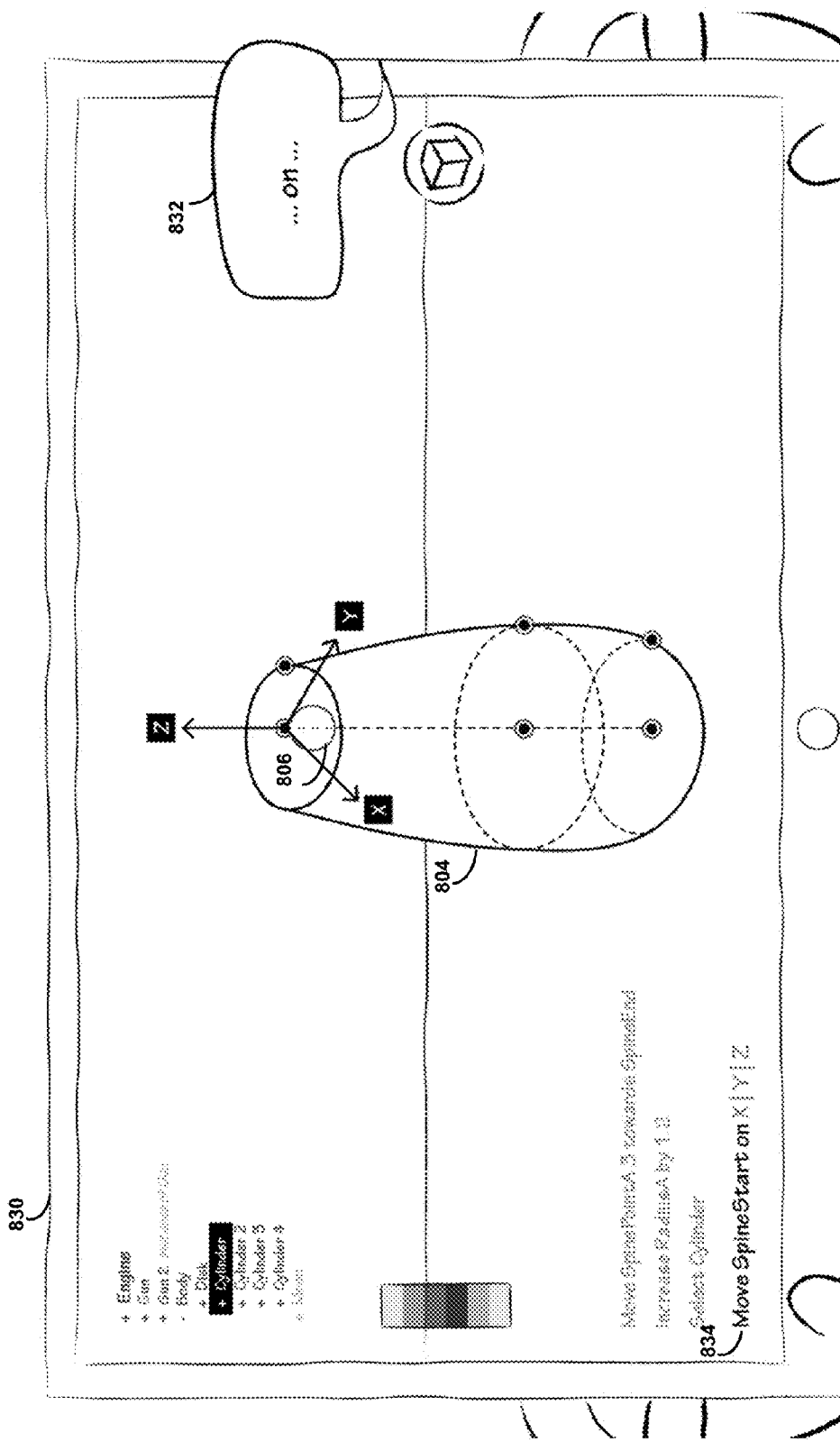

Turning to FIG. 8C, as the user speaks the word "on" 832, the x, y, and z axes appears at control point 806 which is associated with the "SpineStart" label of the smart object 804. The word "on" is appended to the rest of the phrase in block 834.

Figure 8D:
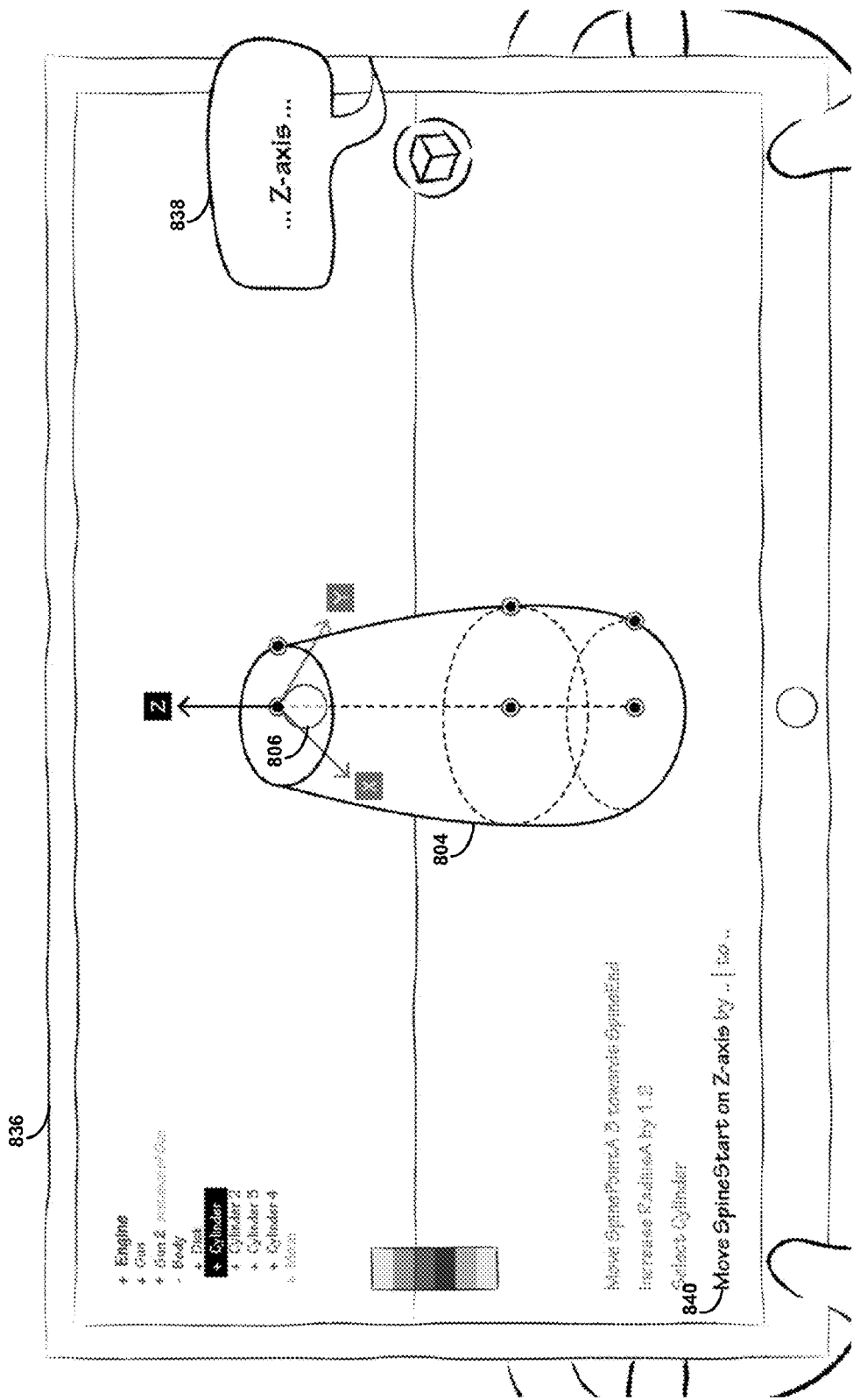

Moving on to FIG. 8D, when the user speaks the phrase "z-axis" 838, the z-axis is highlighted in the user interface 836 by ghosting the labels of the x and y axes of smart object 804. The phrase "z-axis" is then appended to the rest of the phrase in block 840.

Figure 8E:
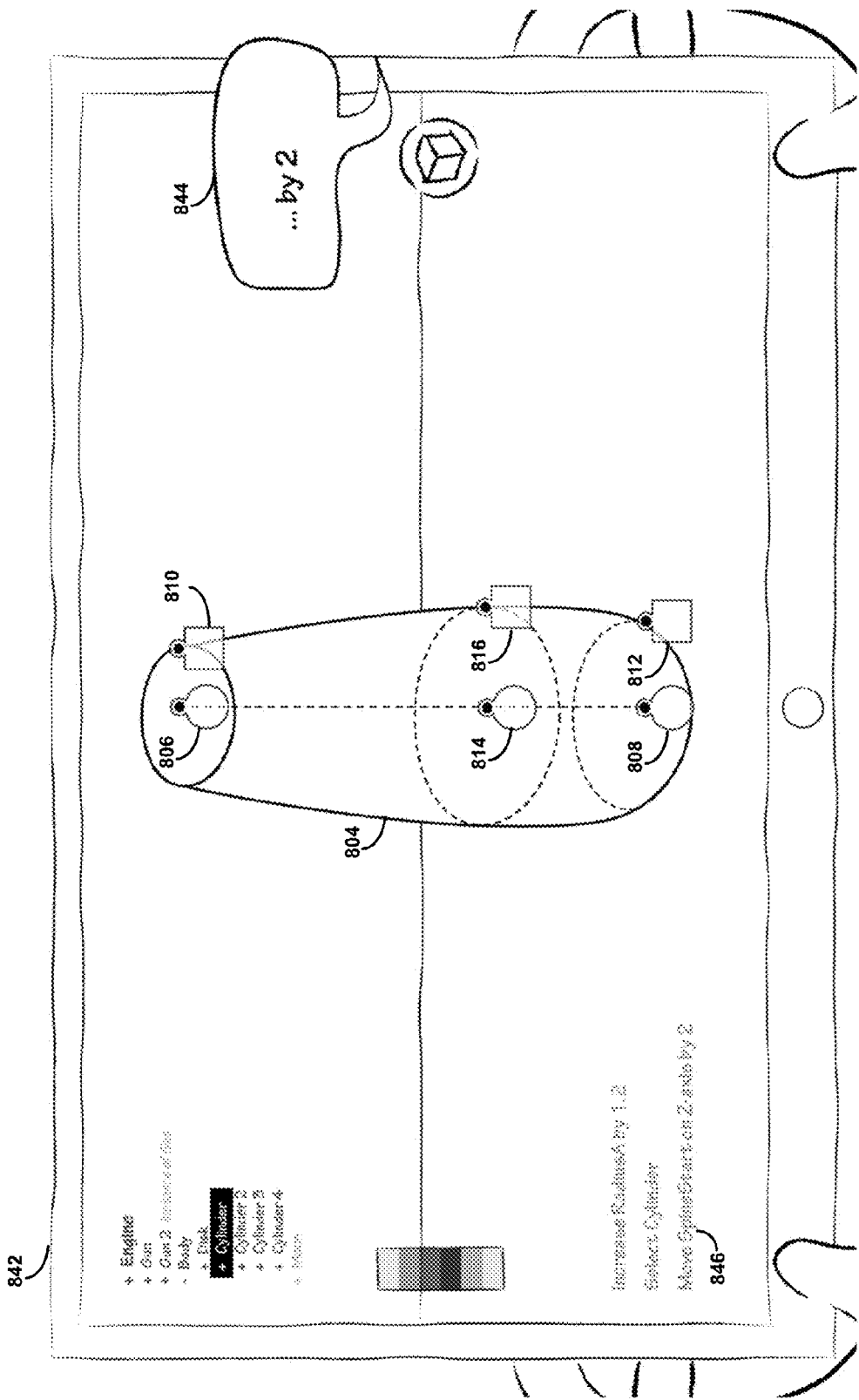

FIG. 8E shows the result when the user speaks the words "by 2" 844 which completes the voice command. The complete voice command is shown in block 846. The smart object is scaled by 2 units along the z-axis using the SpineStart control point 806 and the result is shown in FIG. 8E. All the control points 806, 808, 810, 812, 814, 816 are then displayed on the smart object 804 for additional transformations.

Figure 9A:
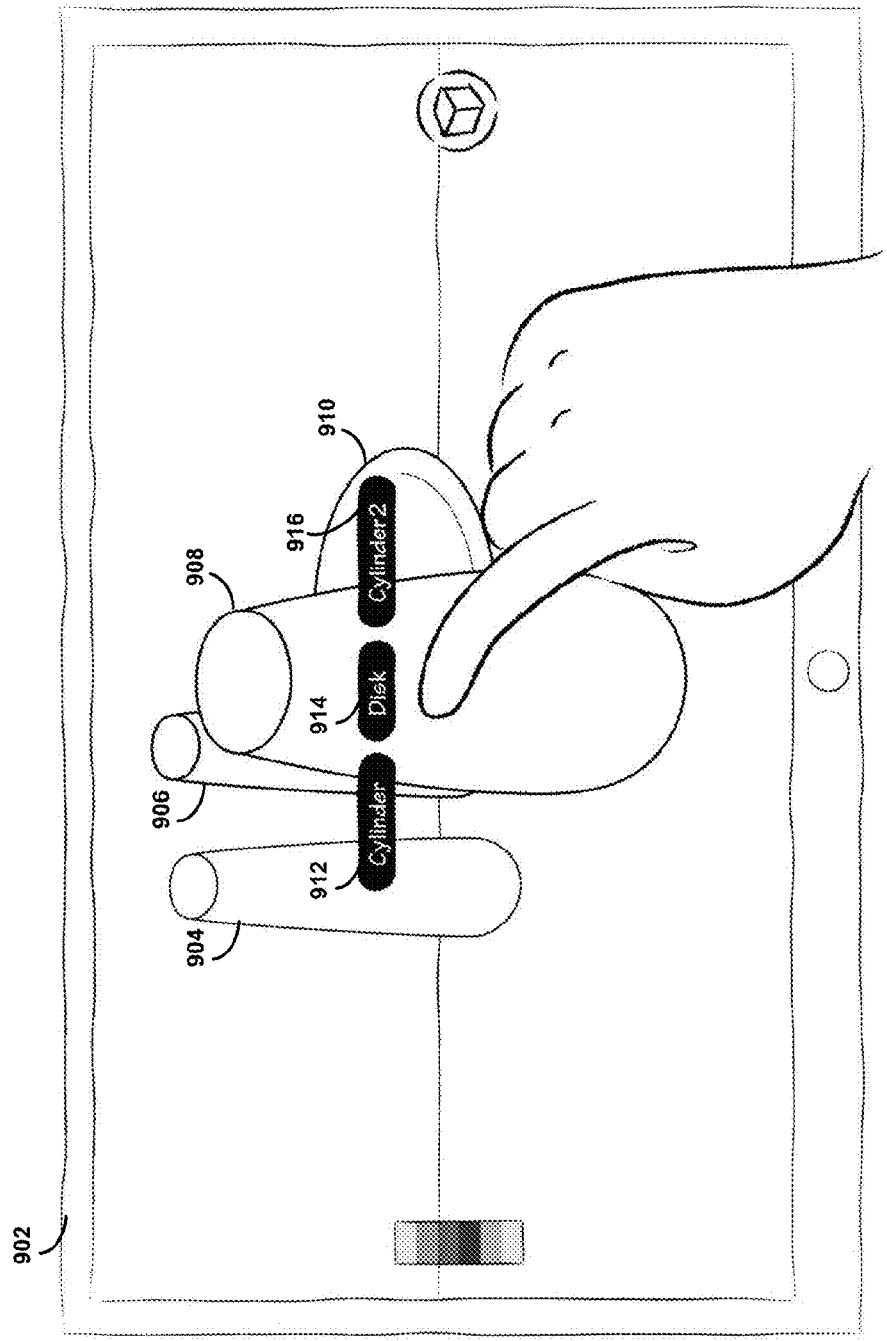
FIGS. 9A-9C are exemplary illustrations showing selection of a smart object from multiple overlapping objects.
Figure 9B:
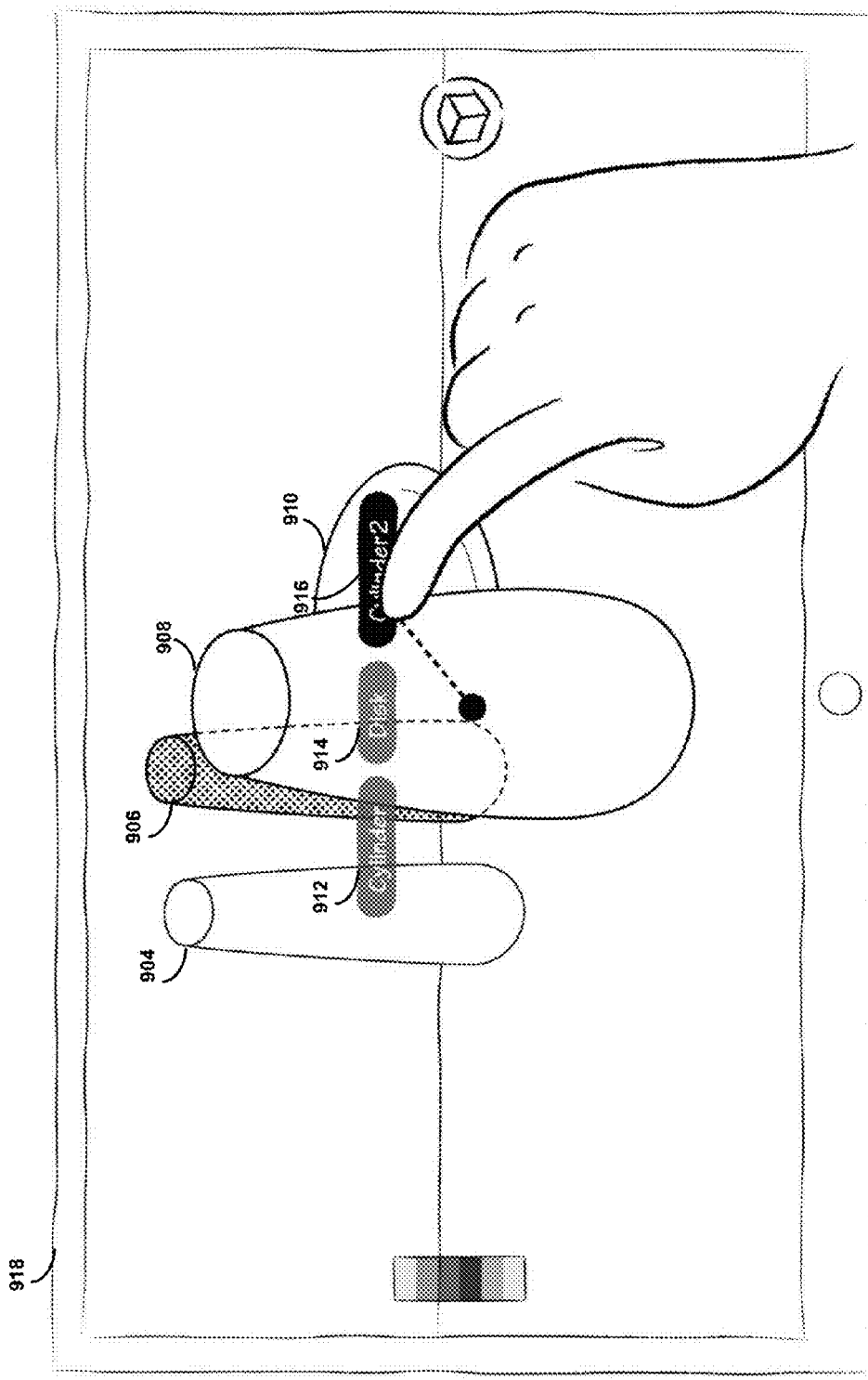
Figure 9C:
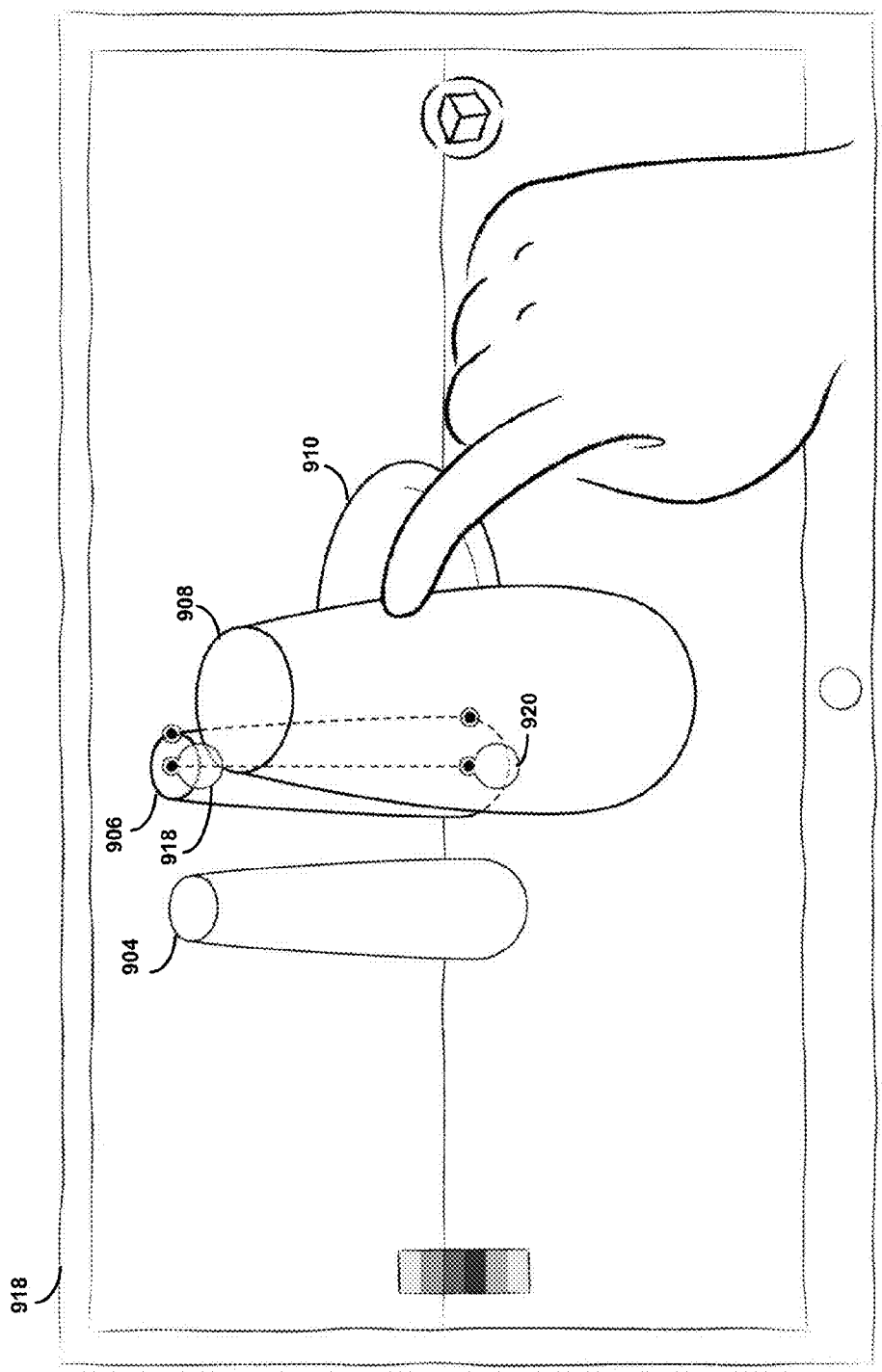

FIGS. 9A-9C illustrate the manner in which a smart object is accessed when displayed with overlapping smart objects. For example, as shown in FIG. 9A, there is shown a user interface 902 containing three cylinder-shaped smart objects, 904, 906, 908, and a disk-shaped smart object 910. Smart object 908 is in the foreground of the user interface 902 and smart objects 904, 906 and 910 are in the background. In order for a user to access the control points associated with smart object 906, the user points to any object and a menu is displayed with a label for each object viewed in the background. As shown in FIG. 9A, as the user touches smart object 908, a menu appears with labels for each of the smart objects in the background, such as "Cylinder" 912, "Disk" 914 and "Cylinder2" 916.

Turning to FIG. 9B, as the user touches the label for Cylinder2 916, an outline of the smart object 906 is displayed within foreground object 908. The portions of Cylinder2 906 that do not overlap with smart object 908 are shaded. Referring to FIG. 9C, after the user selects Cylinder2, the smart object 906 and its control points 918, 920 are viewed in the foreground over smart object 908. The user may then use the control points 918, 920 to perform transformations on smart object 906.

Attention now turns to a description of embodiments of exemplary methods of the self-disclosing control points. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 10:
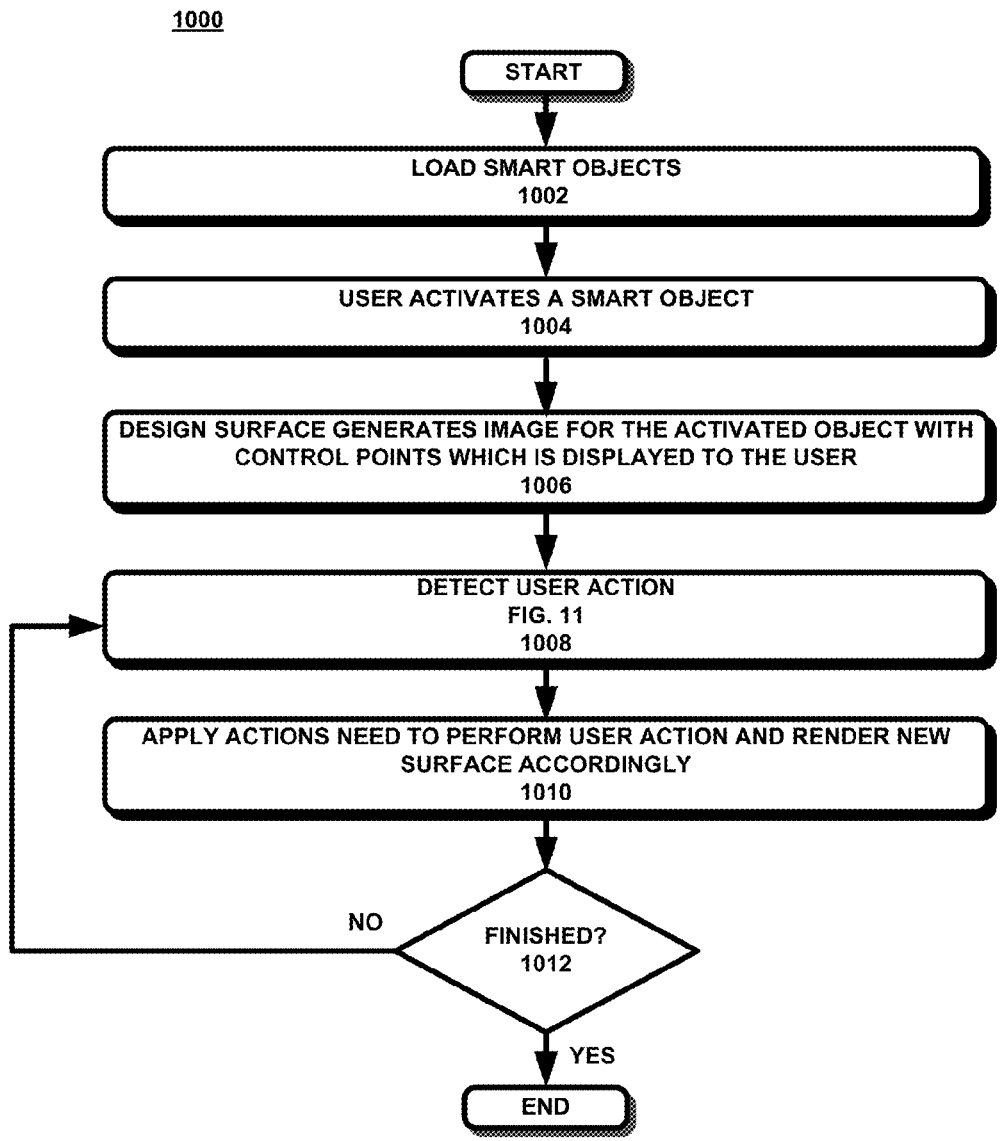
FIG. 10 is a flow diagram illustrating a first exemplary method.

FIG. 10 illustrates a flow diagram of an exemplary method 1000. It should be noted that the method 1000 may be representative of some or all of the operations executed by one or more embodiments described herein and that the method can include more or less operations than that which is described in FIG. 10.

Initially, the design surface 106 loads a smart object file containing multiple smart objects and constructs an icon representing each smart object which may be displayed in the user interface 120 in a menu bar, such as the menu bar 230 shown in FIG. 2 (block 1002). The user may then activate a smart object by touching the icon as shown in FIG. 2 (block 1004). When the user activates a smart object (block 1004), the design surface 106 renders the smart object with its control points which is displayed to the user through user interface 120 (block 1006).

The user is then able to interact with one or more of the control points or with the transformation templates (block 1008). A user's interaction may take the form of touches to a touch screen, keyboard strokes, mouse clicks, voice-activated commands, and the like. The user action is detected (block 1008) and the instructions needed to implement the user action are executed (block 1010). Depending on the type of user action, the design surface may be re-rendered onto the display (block 1010). The method continues to detect and process the user actions (block 1012—no) until the user is finished (block 1012—yes).

Figure 11:
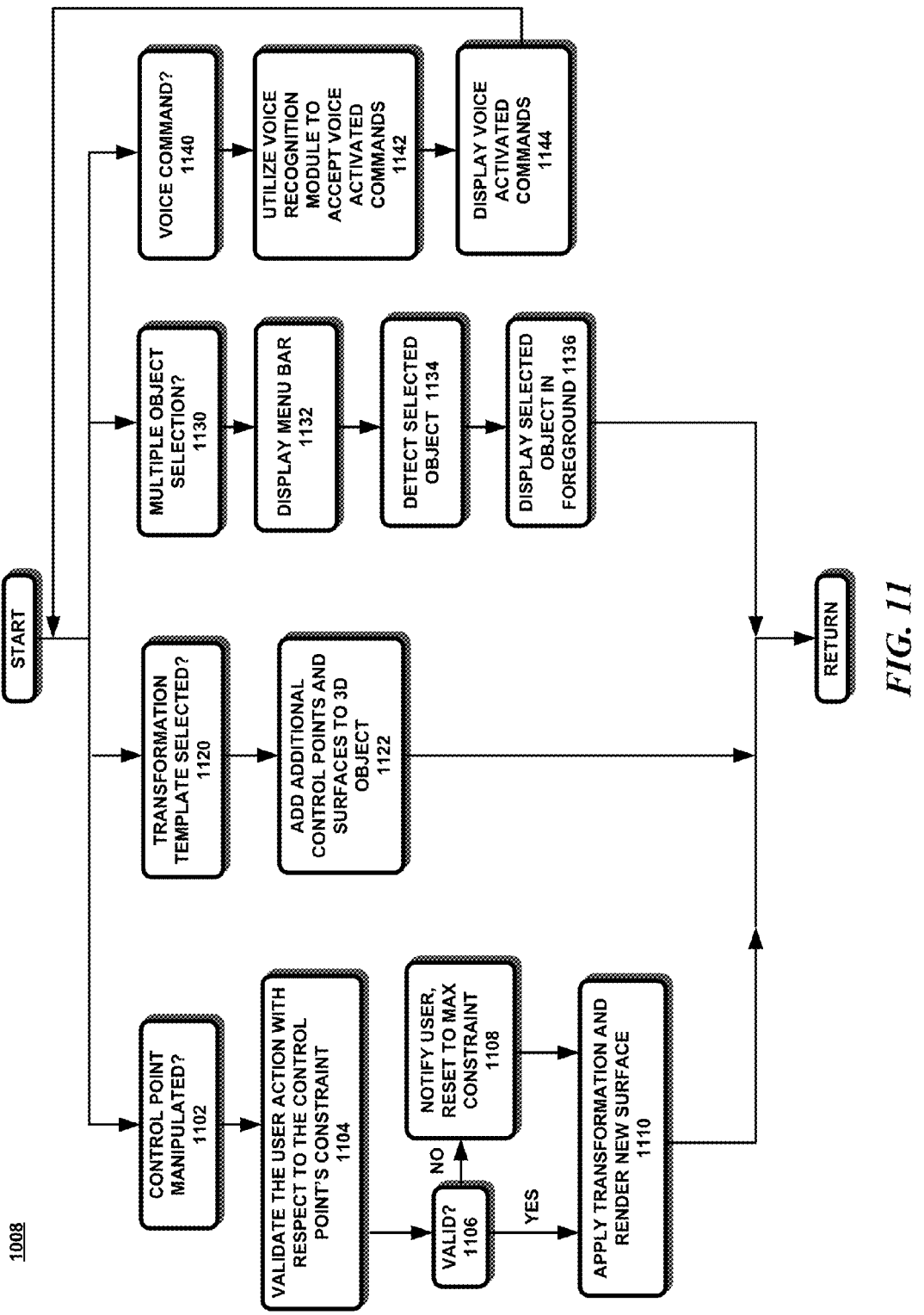
FIG. 11 illustrates a flow diagram illustrating a second exemplary method.

Referring to FIG. 11, there is shown in further detail an exemplary method of detecting and processing a user action. If the user action is an action applied to a control point (block 1102), then the control module 125 validates the user action with respect to the control point's constraint (block 1104). If the user action is not within the control point's constraint (block 1106—no), then the user is notified and the user action is applied to the control point's constraint maximum (block 1108). Then (block 1106—yes, block 1108), the transformation indicated by user action is applied and a new surface rendered (block 1110).

If the user action is an action to select a transformation template (block 1120), then the transformation template is selected (block 1122). The smart objects embedded in the transformation template are applied to a 3D object which may add additional control points and/or surfaces to the 3D object which are rendered onto the display (block 1122).

If the user action is to select an object with multiple overlapping objects (block 1130), then as the user touches an object, a menu bar is displayed with labels describing each of the multiple objects (block 1132). As the user selects one of the labels, the selected object is detected (block 1134) and displayed in the foreground of the display (block 1136).

If the user action is initiated through a voice command (block 1140), then the voice recognition module accepts the voice activated command (block 1142) which is displayed for the user (block 1144). The user action is then processed based on the type of action that is requested (blocks 1102, 1120, 1130).

Figure 12:
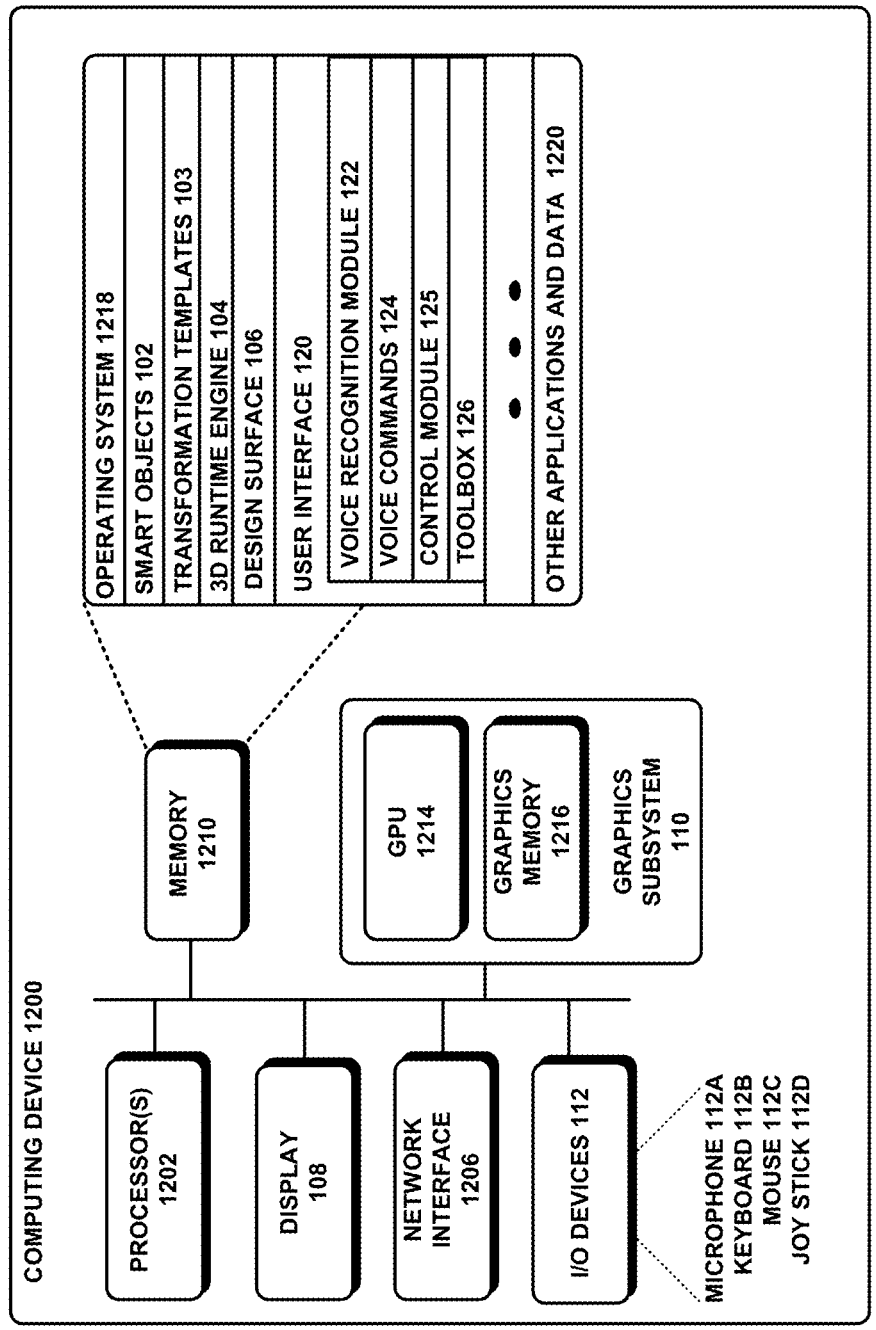
FIG. 12 is a block diagram illustrating an exemplary operating environment.

Attention now turns to a discussion of an exemplary operating environment. Referring now to FIG. 12, there is shown a schematic block diagram of an exemplary operating environment 1200. It should be noted that the operating environment 1200 is exemplary and is not intended to suggest any limitation as to the functionality of the embodiments.

The operating environment may be configured as a computing device 1200. The computing device may be any type of electronic device capable of executing programmable instructions, such as without limitation, a mobile device, a personal digital assistant, a mobile computing device, a smart phone, a cellular telephone, a handheld computer, a tablet, a server, a server array or server farm, a web server, a network server, an Internet server, a work station, a mini-computer, a mainframe computer, a supercomputer, a network appliance, a web appliance, a distributed computing system, multiprocessor systems, or combination thereof.

The computing device 1200 may have one or more processors 1202, a display 108, a network interface 1206, one or more input devices 112, a memory 1210, and a graphics subsystem 110. A processor 1202 may be any commercially available processor and may include dual microprocessors and multi-processor architectures. The display 108 may be any visual display unit and it may be embedded within a computing device or physically separated from it. The network interface 1206 facilitates wired or wireless communications between the computing device 1200 and a communications framework. The graphics subsystem 110 is a specialized computing unit for rendering graphics images. The graphics subsystem 110 may be implemented as a graphics card, specialized graphics circuitry, and the like. The graphics subsystem 110 may include a graphics processing unit (GPU) 1214 and a graphics memory 1216.

The memory 1210 may be any computer-readable storage media that may store executable procedures, applications, and data. The memory 1210 may be implemented as a computer-readable storage device composed of any type of memory device (e.g., random access memory, read-only memory, etc.), magnetic storage, volatile storage, non-volatile storage, optical storage, DVD, CD, floppy disk drive, flash drive, and the like. The computer-readable storage media does not pertain to propagated signals, such as modulated data signals transmitted through a carrier wave. The memory 1210 may also include one or more external storage devices or remotely located storage devices. The memory 1210 may contain instructions and data as follows:

an operating system 1218;
  one or more smart objects 102;
  one or more transformation templates 103;
  a 3D runtime engine 104;
  a design surface 106;
  a user interface 120 including a voice recognition module 122, voice commands 124, a control module 125, and a toolbox 126; and
  various other applications and data 1220.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method, comprising:
rendering on a display device a smart object, the smart object including a preconfigured control point embedded in a predetermined location on a three-dimensional (3D) graphics object, the preconfigured control point including program code that is configured to apply at least one behavior to the 3D graphics object at the predetermined location subject to a constraint when the preconfigured control point is activated by a user, the behavior applying at least one transformation to the 3D graphics object, the constraint imposing a limit on the at least one transformation;
detecting a user action applied to the preconfigured control point
activating the program code to perform the at least one transformation within the constraint;
transforming the 3D graphics object in accordance with the detected user action subject to the behavior and constraint of the preconfigured control point; and
displaying the transformed 3D graphics object onto a display.

2. The computer-implemented method of claim 1, further comprising:
prior to transforming the 3D graphics object, validating that the user action complies with the constraint associated with the preconfigured control point.

3. The computer-implemented method of claim 2, further comprising:
when the user action exceeds the constraint, resetting the user action to be at a maximum value supported by the constraint.

4. The computer-implemented method of claim 2, further comprising:
invoking executable instructions to perform additional actions in response to the user action exceeding the constraint.

5. The computer-implemented method of claim 1, wherein the transformation is a select one of scaling, rotation, and translation.

6. The computer-implemented method of claim 1, further comprising:
visually displaying a label with a select preconfigured control point; and
activating through a voice command a transformation to the select preconfigured control point by referencing a label associated with the select preconfigured control point.

7. The computer-implemented method of claim 1, further comprising:
providing one or more transformation templates, each transformation template having one or more additional control points;
detecting a user action to activate a select transformation template for use with the 3D graphics object; and
adding the additional control points to the 3D graphics object.

8. The computer-implemented method of claim 7, further comprising:
transforming the 3D graphics object in accordance with the select transformation template.

9. The computer-implemented method of claim 1, wherein the preconfigured control point is associated with a transformation applied along one or more of x, y, or z axes.

10. A system, comprising:
at least one processor and at least one memory;
wherein the memory comprises:
data representing a smart object that describes a three-dimensional (3D) graphics object having a preconfigured control point embedded in a predetermined location in the 3D graphics object, the predetermined control point including program code that is configured to apply at least one behavior to the 3D graphics object at the predetermined location subject to a constraint when the preconfigured control point is activated by a user, the behavior applying at least one transformation to the 3D graphics object, the constraint imposing a limit on the at least one transformation;
wherein the processor is configured to execute a user interface that:
automatically displays the preconfigured control point embedded onto the 3D graphics object in a predetermined location that identifies a position on the 3D graphics object at which the transformation is made to the 3D graphics object;
activates the program code to perform the at least one transformation within the constraint when the user interacts with the preconfigured control point; and
displays the transformed 3D graphics object.

11. The system of claim 10, wherein the memory further comprises:
one or more transformation templates, a transformation template associated with a specific transformation;
wherein the user interface is configured to insert one or more additional control points into the select smart object to perform the specific transformation based on at least one transformation template.

12. The system of claim 10, wherein the user interface is further configured to recognize voice commands that initiate a transformation by referencing a label associated with the preconfigured control point.

13. The system of claim 10, wherein the user interface is further configured to:
display a first label with a first smart object displayed in the user interface hidden behind a second smart object; and
uses the first label to select the first smart object.

14. The system of claim 10, wherein the user interface is further configured to:
provide an axis lock menu that enables a user to lock a transformation to a select axis displayed with the smart object.

15. The system of claim 10, wherein the user interface is part of an integrated development environment, a 3D printer application, a graphics application controlling a 3D printer, or a gaming application.

16. A device, comprising:
at least one processor and a memory;
the at least one processor configured to:
render on a display device a smart object, the smart object including a preconfigured control point embedded in a predetermined location on a three-dimensional (3D) graphics object, the preconfigured control point including program code that is configured to apply at least one behavior to the 3D graphics object at the predetermined location subject to a constraint when the preconfigured control point is activated by a user, the behavior applying at least one transformation to the 3D graphics object, the constraint imposing a limit on the at least one transformation;
detect a user action applied to the preconfigured control point;
activate the program code to perform the at least one transformation within the constraint;
transform the 3D graphics object in accordance with the detected user action subject to the behavior and constraint of the preconfigured control point; and
display the transformed 3D graphics object onto a display.

17. The device of claim 16, wherein the at least one processor is further configured to:
insert one or more additional control points onto the 3D graphics image through the use of at least one transformation template.

18. The device of claim 16, wherein the 3D graphics image is a mesh.

19. The device of claim 16, wherein the user action is a voice command that initiates a transformation by referencing a label associated with the preconfigured control point.

20. The device of claim 16, wherein the at least one processor renders the smart object in one of an integrated development environment, a 3D printer application, a graphics application controlling a 3D printer, or a gaming application.

* * * * *